(12) United States Patent
Yamada et al.

(10) Patent No.: US 10,257,871 B2
(45) Date of Patent: Apr. 9, 2019

(54) DEVICE TO-DEVICE COMMUNICATIONS APPARATUS AND METHODS

(71) Applicant: Sharp Laboratories of America, Inc., Camas, WA (US)

(72) Inventors: Shohei Yamada, Osaka (JP); Jia Sheng, Vancouver, WA (US)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/660,491

(22) Filed: Mar. 17, 2015

(65) Prior Publication Data
US 2015/0271720 A1    Sep. 24, 2015

Related U.S. Application Data

(60) Provisional application No. 61/955,010, filed on Mar. 18, 2014.

(51) Int. Cl.
*H04W 48/20*    (2009.01)
*H04W 72/02*    (2009.01)
(Continued)

(52) U.S. Cl.
CPC .......... *H04W 76/14* (2018.02); *H04W 48/20* (2013.01); *H04W 72/02* (2013.01); *H04W 72/0453* (2013.01)

(58) Field of Classification Search
CPC ..... H04W 4/005; H04W 4/008; H04W 8/005; H04W 36/0055; H04W 36/0083;
(Continued)

(56) References Cited

U.S. PATENT DOCUMENTS 9,332,512 B2    5/2016  Sebire
9,426,701 B2 *  8/2016  Yu .................. H04W 76/14
(Continued)

FOREIGN PATENT DOCUMENTS

WO    WO 2013/109100 A1    7/2013
WO       2013/171115 A1    11/2013
(Continued)

OTHER PUBLICATIONS

Unknown, R2-142631: Prioritized Reselection of D2D Supported Frequency, May 23, 2014, 3GPP TSG-RAN WG2 #86, 3GPP.*
(Continued)

*Primary Examiner* — Eric Nowlin
(74) *Attorney, Agent, or Firm* — Nixon & Vanderhye P.C.

(57) ABSTRACT

As a result of the selection/reselection operation, a wireless terminal (26) selects the high priority candidate frequency for use in the device-to-device (D2D) communications. During the cell selection/reselection operation, the wireless terminal (26) is required to consider selection/reselection candidate frequencies at which the wireless terminal (26) cannot receive or transmit device-to-device (D2D) signals to be of low priority candidate frequencies when the wireless terminal (26) is capable of device-to-device (D2D) communications and is receiving or transmitting, or anticipating receiving or transmitting, device-to-device (D2D) signals on device-to-device (D2D) supported frequencies. In another basic mode predefined RRC Idle Mode state transition(s) are used to determine when a wireless terminal (26) encounters an out-of-coverage situation for device-to-device (D2D) communications purposes; and when the out-of-coverage situation is determined, the wireless terminal (26) uses pre-configured device-to-device (D2D) radio resources for the device-to-device (D2D) communications.

11 Claims, 7 Drawing Sheets

(51) Int. Cl.
*H04W 72/04* (2009.01)
*H04W 76/14* (2018.01)

(58) Field of Classification Search
CPC ..... H04W 36/06; H04W 36/08; H04W 36/24; H04W 36/36; H04W 52/0216; H04W 52/0219; H04W 52/0229; H04W 48/12; H04W 48/20; H04W 72/02; H04W 72/042; H04W 72/0426; H04W 72/0453; H04W 76/022; H04W 76/023; H04W 76/027; H04W 88/06; H04W 72/04; H04W 76/043; H04W 92/18; H04W 48/18; H04W 76/14; H04L 43/16
See application file for complete search history.

(56) References Cited

U.S. PATENT DOCUMENTS

| | | | | |
|---|---|---|---|---|
| 9,445,316 | B2* | 9/2016 | Lu | H04W 36/0055 |
| 9,467,930 | B2* | 10/2016 | Lim | H04W 48/12 |
| 9,655,022 | B2* | 5/2017 | Chuang | H04W 4/70 |
| 9,763,075 | B2* | 9/2017 | Fukuta | H04W 76/14 |
| 9,877,241 | B2* | 1/2018 | Fujishiro | H04W 36/0083 |
| 9,913,184 | B2* | 3/2018 | Jung | H04W 36/08 |
| 9,973,981 | B2* | 5/2018 | Yu | H04W 76/14 |
| 10,051,678 | B2* | 8/2018 | Yamada | H04W 76/14 |
| 2003/0061390 | A1 | 3/2003 | Schaller et al. | |
| 2007/0115884 | A1* | 5/2007 | Shang | H04W 36/30 370/331 |
| 2011/0092204 | A1 | 4/2011 | Iwamura et al. | |
| 2011/0182280 | A1 | 7/2011 | Charbit et al. | |
| 2011/0255509 | A1* | 10/2011 | Huang | H04W 48/20 370/331 |
| 2012/0122463 | A1* | 5/2012 | Chen | H04W 72/082 455/450 |
| 2012/0129540 | A1 | 5/2012 | Hakola et al. | |
| 2013/0051277 | A1 | 2/2013 | Hakola et al. | |
| 2013/0070615 | A1 | 3/2013 | Lennartson et al. | |
| 2013/0102314 | A1* | 4/2013 | Koskela | H04W 36/0072 455/436 |
| 2013/0109301 | A1 | 5/2013 | Hakola et al. | |
| 2013/0148637 | A1 | 6/2013 | Yang et al. | |
| 2013/0155962 | A1 | 6/2013 | Hakola | |
| 2013/0188546 | A1 | 7/2013 | Turtinen et al. | |
| 2013/0195026 | A1 | 8/2013 | Johnsson et al. | |
| 2013/0208697 | A1 | 8/2013 | Hwang et al. | |
| 2013/0223356 | A1* | 8/2013 | Khoshnevis | H04W 72/042 370/329 |
| 2013/0230015 | A1 | 9/2013 | Hoymann et al. | |
| 2013/0288668 | A1 | 10/2013 | Pragada et al. | |
| 2013/0308490 | A1* | 11/2013 | Lim | H04B 7/026 370/252 |
| 2013/0322276 | A1 | 12/2013 | Pelletier et al. | |
| 2013/0322413 | A1 | 12/2013 | Pelletier et al. | |
| 2013/0324114 | A1 | 12/2013 | Raghothaman et al. | |
| 2013/0331054 | A1 | 12/2013 | Kodali | |
| 2014/0004867 | A1 | 1/2014 | Noh | |
| 2014/0010172 | A1 | 1/2014 | Wei et al. | |
| 2014/0056220 | A1 | 2/2014 | Poitau et al. | |
| 2014/0086176 | A1 | 3/2014 | Liu | |
| 2014/0098761 | A1 | 4/2014 | Lee | |
| 2014/0106757 | A1 | 4/2014 | Hakola | |
| 2014/0128078 | A1 | 5/2014 | Zhu et al. | |
| 2014/0148177 | A1 | 5/2014 | Ratasuk | |
| 2014/0153417 | A1 | 6/2014 | Gupta et al. | |
| 2014/0169346 | A1 | 6/2014 | Futaki | |
| 2014/0185530 | A1 | 7/2014 | Kuchibhotla | |
| 2014/0187283 | A1 | 7/2014 | Nimbalker | |
| 2014/0213221 | A1 | 7/2014 | Chai | |
| 2014/0233528 | A1 | 8/2014 | Webb | |
| 2014/0269419 | A1 | 9/2014 | Han | |
| 2014/0274066 | A1* | 9/2014 | Fodor | H04W 36/08 455/437 |
| 2014/0314057 | A1 | 10/2014 | Van Phan et al. | |
| 2014/0328329 | A1 | 11/2014 | Novlan | |
| 2014/0342747 | A1 | 11/2014 | Lee et al. | |
| 2015/0043448 | A1 | 2/2015 | Chatterjee | |
| 2015/0071207 | A1 | 3/2015 | Seo | |
| 2015/0078279 | A1 | 3/2015 | Ko | |
| 2015/0139006 | A1* | 5/2015 | Seo | H04J 11/005 370/252 |
| 2015/0146687 | A1* | 5/2015 | Kim | H04W 76/023 370/331 |
| 2015/0208453 | A1 | 7/2015 | Yamazaki | |
| 2015/0215767 | A1* | 7/2015 | Siomina | H04W 8/02 455/435.2 |
| 2015/0215881 | A1 | 7/2015 | Parkvall | |
| 2015/0215903 | A1 | 7/2015 | Zhao et al. | |
| 2015/0215977 | A1 | 7/2015 | Yamazaki | |
| 2015/0215981 | A1 | 7/2015 | Patil | |
| 2015/0223184 | A1 | 8/2015 | Bergstrom | |
| 2015/0245193 | A1 | 8/2015 | Xiong | |
| 2015/0245307 | A1 | 8/2015 | Chen | |
| 2015/0257153 | A1 | 9/2015 | Yamazaki | |
| 2015/0264588 | A1 | 9/2015 | Li | |
| 2015/0264733 | A1 | 9/2015 | Guo | |
| 2015/0271720 | A1* | 9/2015 | Yamada | H04W 76/14 370/331 |
| 2015/0271807 | A1 | 9/2015 | Patil | |
| 2015/0271841 | A1* | 9/2015 | Yamada | H04W 76/023 370/329 |
| 2015/0271846 | A1 | 9/2015 | Kowalski et al. | |
| 2015/0304902 | A1* | 10/2015 | Yu | H04W 76/14 455/436 |
| 2015/0304919 | A1* | 10/2015 | Jung | H04W 48/18 370/331 |
| 2015/0312821 | A1 | 10/2015 | Yamazaki | |
| 2015/0312923 | A1* | 10/2015 | Guo | H04W 72/121 370/329 |
| 2015/0319797 | A1* | 11/2015 | Yamada | H04W 72/14 370/329 |
| 2015/0327047 | A1 | 11/2015 | Tirola | |
| 2015/0327240 | A1* | 11/2015 | Yamada | H04W 72/048 455/426.1 |
| 2015/0334669 | A1 | 11/2015 | Zhang | |
| 2016/0021594 | A1* | 1/2016 | Yilmaz | H04W 36/30 370/332 |
| 2016/0044552 | A1* | 2/2016 | Heo | H04L 5/001 370/331 |
| 2016/0044618 | A1 | 2/2016 | Sheng et al. | |
| 2016/0081073 | A1 | 3/2016 | Lindoff | |
| 2016/0094975 | A1* | 3/2016 | Sheng | H04W 72/042 370/216 |
| 2016/0100401 | A1 | 4/2016 | Xiong | |
| 2016/0112172 | A1* | 4/2016 | Seo | H04L 5/0007 370/329 |
| 2016/0127970 | A1* | 5/2016 | Chuang | H04W 4/70 455/436 |
| 2016/0143078 | A1 | 5/2016 | Jeong | |
| 2016/0183076 | A1 | 6/2016 | Bagayoko | |
| 2016/0192269 | A1* | 6/2016 | Kim | H04W 36/30 370/332 |
| 2016/0192426 | A1 | 6/2016 | Noh | |
| 2016/0205534 | A1* | 7/2016 | Fujishiro | H04W 72/048 455/434 |
| 2016/0212665 | A1* | 7/2016 | Fukuta | H04W 76/14 |
| 2016/0212721 | A1* | 7/2016 | Sheng | H04W 48/16 |
| 2016/0219528 | A1 | 7/2016 | Kawasaki | |
| 2016/0219566 | A1* | 7/2016 | Jung | H04W 72/04 |
| 2016/0219574 | A1 | 7/2016 | Ribeiro | |
| 2016/0262111 | A1 | 9/2016 | Boudreau | |
| 2016/0269953 | A1* | 9/2016 | Jung | H04W 36/06 |
| 2016/0278009 | A1 | 9/2016 | Sorrentino | |
| 2016/0345214 | A1* | 11/2016 | Yu | H04W 76/14 |
| 2016/0345307 | A1 | 11/2016 | Huang et al. | |
| 2016/0381630 | A1* | 12/2016 | Krishnamoorthy | H04W 36/08 370/329 |
| 2017/0006653 | A1 | 1/2017 | Zeng | |
| 2017/0013523 | A1* | 1/2017 | Jung | H04W 36/08 |
| 2017/0034751 | A1* | 2/2017 | Fujishiro | H04W 36/0083 |
| 2017/0071001 | A1 | 3/2017 | Ahmadi | |
| 2017/0164381 | A1 | 6/2017 | Kim | |

(56) References Cited

U.S. PATENT DOCUMENTS

| | | | |
|---|---|---|---|
| 2017/0223584 A1* | 8/2017 | Deng | H04W 48/08 |
| 2017/0272989 A1* | 9/2017 | Wu | H04W 48/16 |
| 2017/0280455 A1* | 9/2017 | Fujishiro | H04W 72/02 |
| 2017/0303297 A1* | 10/2017 | Lee | H04W 72/005 |
| 2018/0115931 A1* | 4/2018 | Lee | H04W 36/08 |
| 2018/0139669 A1* | 5/2018 | Jung | H04W 36/00 |

FOREIGN PATENT DOCUMENTS

| | | |
|---|---|---|
| WO | 2013/083197 A1 | 12/2013 |
| WO | WO 2014/014326 A1 | 1/2014 |
| WO | 2015/063186 A1 | 5/2015 |

OTHER PUBLICATIONS

Acer Incorporated, R2-144812: Cell Reselection Priority with ProSe Communication, Nov. 21, 2014, 3GPP TSG RAN WG2#88, 3GPP.*
Intel Corporation, R2-152168: Priority Handling for ProSe, May 29, 2015, 3GPP TSG-RAN WG2 Meeting #90, 3GPP.*
Office Action dated Oct. 17, 2016 in U.S. Appl. No. 14/660,622.
International Search Report and Written Opinion dated Jul. 1, 2015 in PCT Application PCT/US2015/21030.
R1-150954, 3GPP TSG-RAN Meeting #80, Change Request, "Correction of Discovery Signal Transmission", Ericsson, Athens, Greece, Feb. 9-13, 2015.
R1-150959, 3GPP TSG-RAN WG1 Meeting #80, Change Request, "Introduction of D2D Feature into 36.212", Huawei, Athens, Greece, Feb. 9-13, 2015.
R2-144223, 3GPP TSG RAN WG2 Meeting #87bis, "Further Mode 2 Switching Rules in RLF Exceptional Case", Sharp, Shanghai, China, Oct. 6-10, 2014.
R1-150899, 3GPP TSG-RAN WG1 Meeting #80, Change Request, "Introduction of ProSe", Alcatel-Lucent, Athens, Greece, Feb. 9-13, 2015.
R1-150961, 3GPP TSG-RAN Meeting #80, Change Request, "Inclusion of ProSe", Ericsson, Athens, Greece, Feb. 9-13, 2015.
R1-150962, 3GPP TSG-RAN Meeting #80, Change Request, "Introduction of D2D (ProSe) Feature into 36.213", Editor (Motorola Mobility), Athens, Greece, Feb. 9-13, 2015.
R1-150252, 3GPP TSG-RAN Meeting #80, Change Request, "Inclusion of Measurement for ProSe", Ericsson, Athens, Greece, Feb. 9-13, 2015.
R2-150645, 3GPP TSG-RAN WG2 Meeting #89, Change Request, "Corrections to Stage 2 Description of ProSe", Intel Corporation, Fujitsu, InterDigital, Huawei, HiSilicon, ZTE, Athens, Greece, Feb. 9-13, 2015.
R2-150699, 3GPP TSGRAN WG2 #89, Change Request, "Introduction of ProSe", LG Electronics Inc., Samsung, ZTE, Athens, Greece, Feb. 9-13, 2015.
R2-150700, 3GPP TSGRAN WG2 #89, Change Request, "Introduction of ProSe", Qualcomm Inc., Athens, Greece, Feb. 9-13, 2015.
R2-150717, 3GPP TSGRAN WG2 #89, Change Request, "Introduction of ProSe", Ericsson, Athens, Greece, Feb. 9-13, 2015.
R2-150570, 3GPP TSGRAN WG2 #89, Change Request, "Introduction of ProSe Direct Communication", Qualcomm Incorporated, Samsung, Athens, Greece, Feb. 9-13, 2015.
R2-150571, 3GPP TSGRAN WG2 #89, Change Request, "Introduction of ProSe Direct Communication", Qualcomm Incorporated, Potevio, Athens, Greece, Feb. 9-13, 2015.
R2-150734, 3GPP TSG-RAN2 #89 Meeting, Change Request, "Introduction of ProSe", Samsung, Athens, Greece, Feb. 9-13, 2015.
RP-150366, TSG-RAN Meeting #67, "CRs to 36.201, 36.211, 36.212, 36.213 & 36.214 to Introduce D2D Feature", TSG RAN WG1, Shanghai, China, Mar. 9-12, 2015.
RP-150374, 3GPP TSG RAN Meeting #67, "RAN2 Agreed CRs on LTE Device to Device Proximity Services", TSG RAN WG2, Shanghai, China, Mar. 9-12, 2015.
FiTS User's Manual for Business Partner, Nov. 19, 2013.
3GPP TS 36.212 v12.3.0, Technical Specification, $3^{rd}$ Generation Partnership Project; Technical Specification Group Radio Access Network; Evolved Universal Terrestrial Radio Access (E-UTRA); Multiplexing and Channel Coding (Release 12) (Dec. 2014).
3GPP TS 36.213 v12.0.0, Technical Specification, $3^{rd}$ Generation Partnership Project; Technical Specification Group Radio Access Network; Evolved Universal Terrestrial Radio Access (E-UTRA); Physical Layer Procedures (Release 12) (Dec. 2013).
3GPP TS 36.201 v12.1.0, Technical Specification, $3^{rd}$ Generation Partnership Project; Technical Specification Group Radio Access Network; Evolved Universal Terrestrial Radio Access (E-UTRA); LTE Physical Layer; General Description (Release 12) (Dec. 2014).
3GPP TS 36.211 v12.4.0, Technical Specification, $3^{rd}$ Generation Partnership Project; Technical Specification Group Radio Access Network; Evolved Universal Terrestrial Radio Access (E-UTRA); Physical Channels and Modulation (Release 12) (Dec. 2014).
3GPP TS 36.214 v12.1.0, Technical Specification, $3^{rd}$ Generation Partnership Project; Technical Specification Group Radio Access Network; Evolved Universal Terrestrial Radio Access (E-UTRA); Physical Layer; Measurements (Release 12) (Dec. 2014).
3GPP TS 36.300 v12.4.0, Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; State 2 (Release 12) (Dec. 2014).
3GPP TS 36.306 v12.3.0, Technical Specification, $3^{rd}$ Generation Partnership Project; Technical Specification Group Radio Access Network; Evolved Universal Terrestrial Radio Access (E-UTRA); User Equipment (UE) Radio Access Capabilities (Release 12) (Dec. 2014).
3GPP TS 36.331 v12.4.0, Technical Specification, $3^{rd}$ Generation Partnership Project; Technical Specification Group Radio Access Network; Evolved Universal Terrestrial Radio Access (E-UTRA); Radio Resource Control (RRC) Protocol Specification (Release 12) (Dec. 2014).
3GPP TS 36.321 v12.4.0, Technical Specification, $3^{rd}$ Generation Partnership Project; Technical Specification Group Radio Access Network; Evolved Universal Terrestrial Radio Access (E-UTRA); Medium Access Control (MAC) Protocol Specification (Release 12) (Dec. 2014).
3GPP TS 36.322 v12.1.0, Technical Specification, $3^{rd}$ Generation Partnership Project; Technical Specification Group Radio Access Network; Evolved Universal Terrestrial Radio Access (E-UTRA); Radio Link Control (RLC) Protocol Specification (Release 12) (Sep. 2014).
3GPP TS 36.323 v12.2.0, Technical Specification, $3^{rd}$ Generation Partnership Project; Technical Specification Group Radio Access Network; Evolved Universal Terrestrial Radio Access (E-UTRA); Packet data Convergence Protocol (PDCP) Specification (Release 12) (Dec. 2014).
3GPP TS 36.304 v12.3.0, Technical Specification, $3^{rd}$ Generation Partnership Project; Technical Specification Group Radio Access Network; Evolved Universal Terrestrial Radio Access (E-UTRA); User Equipment (UE) Procedures in Idle Mode (Release 12) (Dec. 2014).
3GPP TR 36.843, v1.2.0, Technical Report, $3^{rd}$ Generation Partnership Project, Technical Specification Group Radio Access Network; Study of LTE Device to Device Proximity Services; Radio Aspects (Release 12) (Feb. 2014).
Final Office Action dated Sep. 30, 2016 in U.S. Appl. No. 14/660,587.
Office Action dated Jun. 10, 2016 in U.S. Appl. No. 14/660,587.
Advisory Action dated May 10, 2016 in U.S. Appl. No. 14/660,587.
Final Office Action dated Mar. 2, 2016 in U.S. Appl. No. 14/660,587.
Office Action dated Oct. 5, 2015 in U.S. Appl. No. 14/660,587.
International Search Report and Written Opinion dated Aug. 11, 2015 in PCT Application PCAT/US2015/21045.
RP-122009, 3GPP TSG RAN Meeting #58, "Study on LTE Device to Device Proximity Services", Qualcomm Incorporated, Dec. 7, 2012.

(56) References Cited

OTHER PUBLICATIONS

RP-140126, 3GPP TSG-RAN WG #63, Fukuoka, Japan, Mar. 3-6, 2014, "Cover Sheet for TR 36.843 v1.2.0 on Study of LTE Device to Device Proximity Services; Radio Aspects", Qualcomm Incorporated (Rapporteur).
International Search Report and Written Opinion dated Jun. 25, 2015 in PCT Application No. PCT/US2015/21041.
International Search Report and Written Opinion dated Jun. 25, 2015 in PCT Application No. PCT/US2015/21027.
Office Action dated Jan. 18, 2017 in U.S. Appl. No. 14/660,587.
Final Office Action dated Feb. 28, 2017 in U.S. Appl. No. 14/660,559.
3GPP TSG RAN WGI Meeting #77, "Chairman's notes", Seoul, Korea, May 19-23, 2014.
Final Office Action dated Apr. 21, 2017 in U.S. Appl. No. 14/660,587.
Notice of Allowance dated May 2, 2017 in U.S. Appl. No. 14/818,855.
Advisory Action dated Jun. 14, 2017 in U.S. Appl. No. 14/660,559.
International Preliminary Report on Patentability dated Nov. 17, 2016 in PCT Application PCT/US2015/021045.
International Preliminary Report on Patentability dated Nov. 1, 2016 in PCT Application PCT/US2015/021041.
Advisory Action dated Dec. 14, 2016 in U.S. Appl. No. 14/660,587.
R1-142409 3GPP TSG RAN WG1 Meeting #77, Ericsson, "Synchronization Signals and Channel Design for D2D", Seoul, Korea, May 19-23, 2014.
Office Action dated Jul. 27, 2017 in U.S. Appl. No. 14/660,528.
Examiner's Answer dated Apr. 11, 2018 in U.S. Appl. No. 14/660,587.
Supplementary EP Search Report dated Nov. 16, 2017 in EP application 15785943.0.
RP-140416, 3GPP TSG RAN meeting #63, Status Report to TSG, Qualcomm Incorporation, "Study on LTE Device to Device Proximity Services, Radio Aspects", Fukuoka, Japan, Mar. 3-6, 2014.
Final Office Action dated Dec. 11, 2017 in U.S. Appl. No. 14/660,528.
Office Action dated Sep. 12, 2017 in U.S. Appl. No. 14/660,559.
Notice of Allowance dated Sep. 8, 2017 in U.S. Appl. No. 14/818,855.
Supplementary EP Search Report dated Mar. 1, 2018 in EP application 15829148.4.
3GPP TSG RAN WG1 Meeting #76bis, R1-141380, Ericsson, "Synchronization Signals and Channel Design for D2D Discovery and Communication", Shenzhen, China, Mar. 31-Apr. 4, 2014.
3GPP TSG RAN WG1 Meeting #76bis, R1-141166, Intel Corporation, "Discussion on D2DSS Physical Structure", Shenzhen, China, Mar. 31-Apr. 4, 2014.
Supplementary EP Search Report dated Oct. 16, 2017 in EP application 15764859.3.
Office Action dated Sep. 22, 2016 in U.S. Appl. No. 14/660,528.
Office Action dated Jan. 18, 2017 in U.S. Appl. No. 14/660,528.
R2-141854, 3GPP TSG-RAN Working Group 2 meeting #85bis, "Report of 3GPP TSG RAN WG2 meting #85, Prague, Czech Republic, Feb. 10-14, 2013", ETSI MCC, Valencia, Spain, Mar. 31-Apr. 4, 2014.
International Search Report and Written Opinion dated Jun. 25, 2015 in PCT Application No. PCT/US2015/21034.
Office Action dated Sep. 30, 2016 in U.S. Appl. No. 14/660,559.
Office Action dated Jan. 18, 2017 in U.S. Appl. No. 14/818,855.
International Search Report and Written Opinion dated Oct. 23, 2015 in PCT Application PCT/US15/43784.
U.S. Appl. No. 62/055,114, filed Sep. 25, 2014, entitled "Method and Apparatus for Unlicensed Communications Band Access".
U.S. Appl. No. 62/104,365, filed Jan. 16, 2015, entitled "Method and Apparatus for Selecting a Synchronization Signal Source for Device-To-Device Communications".
R2-142829, 3GPP TSG-RAN2 Meeting #86, "Introduction of ProSe", Samsung, Qualcom Incorporation, Seoul, South Korea, May 19-23, 2014.
R1-141256, 3GPP TSG RAN WG1 Meeting #76bis, "Distributed Resource Allocation for D2D Communication", Alcatel-Lucent Shanghai Bell, Alcatel-Lucent, Shen Zhen, China, Mar. 31-Apr. 4, 2014.
R1-141546, 3GPP TSG RAN WG1 Meeting #76bis, Discussion on D2D Operation Outside of Network Coverage (Mode-2), Intel Corporation, Shenzhen, China, Mar. 31-Apr. 4, 2014.
R1-141859, 3GPP TSG RAN WG1 Meeting #76bis, "Way Forward on Discovery Signal Design and Network Assistance", NTT DOCOMO, Huawei, HiSilicon, Samsung, Sony, Sharp, ZTE, LG Electronics, Hitachi, ETRI, Media Tek, Shenzhen, China, Mar. 31-Apr. 4, 2014.
3GPP TS 23.303 V12.0.0 Technical Specification, $3^{rd}$ Generation Partnership Project; Technical Specification Group Services and Systems Aspects; Proximity-based Services (ProSe); Stage 2 (Release 12) (Feb. 2014).
R2-14XXX, 3GPP TSG RAN WG1 Meeting #87, Introduction of ProSe, Samsun, Dresden, German, Aug. 18-22, 2014.
R1-142340 3GPP TSG RAN WG1 Meeting #77, Huawei, HiSilicon, "D2DSS Design", Seoul, Korea, May 19-23, 2014.
R1-133598 3GPP TSG-RAN WG1 #74 Qualcomm Inc., "Techniques for Synchronization", Barcelona, Spain, Aug, 19-23, 2013.
3GPP TSG RAN WG1 #76BIS, "Chairman's notes", Shenzhen, China, Mar. 31-Apr. 4, 2014.
3GPP TSG RAN WG1 Meeting #77, "Chairman's notes", Seoul, Korea, May 19-23, 2014.
R1-142452 3GPP TSG-RAN WG1 Meeting #77, Nokia, NSN, "D2D Synchronization Signal Design", Seoul, Korea, May 19-23, 2014.
R1-141974 3GPP TSG-RAN WG1 #77, Qualcomm Incorporated, "Signal Design for D2D Synchronization", Seoul, Korea, May 19-23, 2014.
R1-135316 3GPP TSG-RAN WG1 #75, Qualcomm Incorporated, "Multi-hop D2D Synchronization Performance", San Francisco USA, Nov. 11-15, 2013.
R2-140312, 3GPP TSG-RAN WG2 Meeting #85, Intel Corporation, "Resource allocation for D2D communication", Prague, Czech Republic, Feb. 10-14, 2014.
R2-140625, 3GPP TSG-RAN WG2 #85, Ericsson, "Resource allocation for D2D transmitters in coverage", Prague, Czech Republic, Feb. 10-14, 2014.
R2-140797, 3GPP TSG-RAN WG2 #85, Ericsson, "Overview of D2D functions needing standardization", Prague, Czech Republic, Feb. 10-14, 2014.

\* cited by examiner

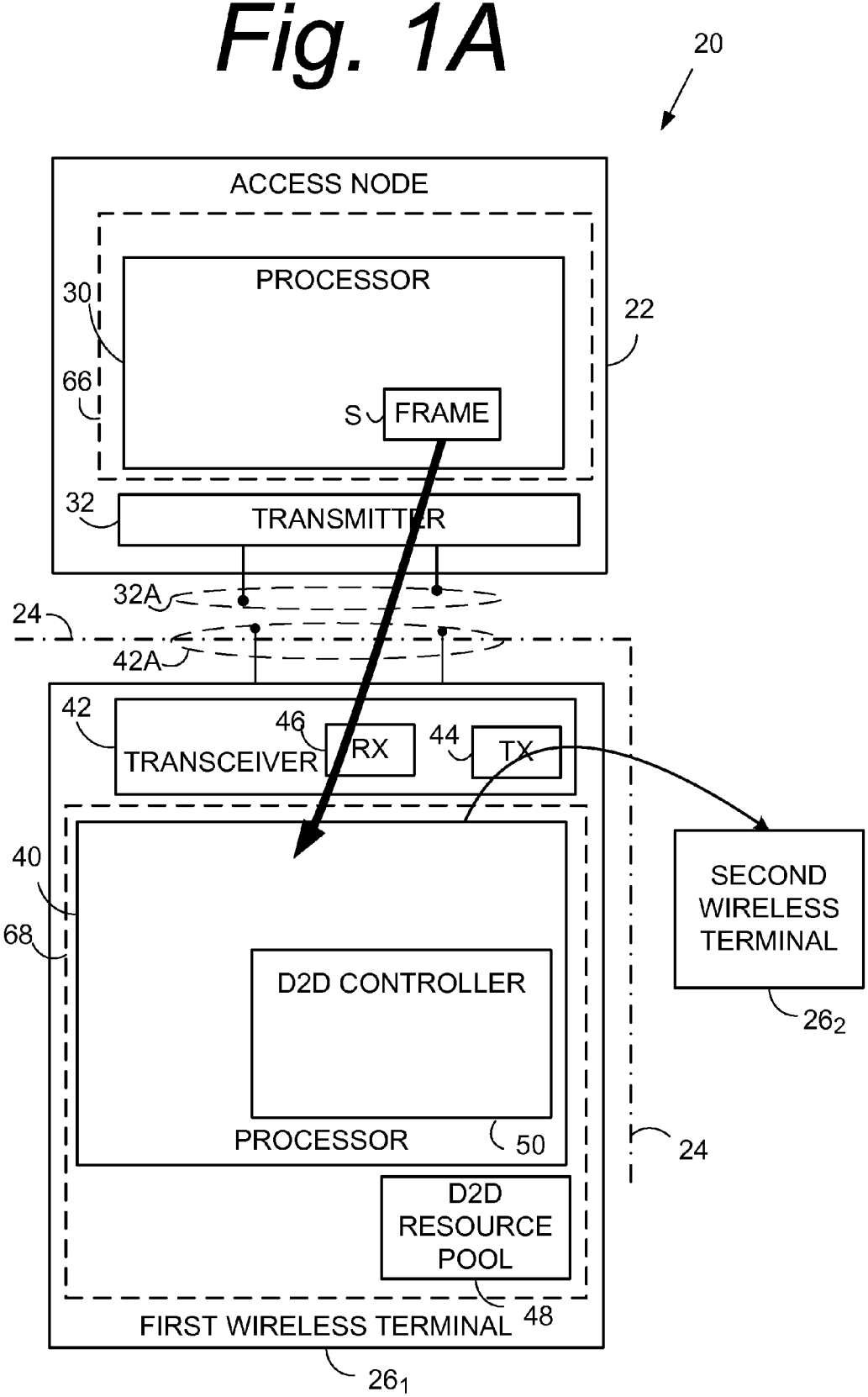

DEVICE TO-DEVICE COMMUNICATIONS APPARATUS AND METHODS

This application claims the priority and benefit of the following United States Provisional Patent application, which is incorporated herein by reference: U.S. Provisional Patent application 61/955,010 filed Mar. 18, 2014, entitled "DETECTING OUT-OF-COVERAGE TRANSITION FOR WIRELESS DEVICE-TO-DEVICE COMMUNICATIONS".

TECHNICAL FIELD

The technology relates to wireless communications, and particularly to allocating or granting radio resources for wireless device-to-device (D2D) communications.

BACKGROUND

When two user equipment terminals (e.g., mobile communication devices) of a cellular network or other telecommunication system communicate with each other, their data path typically goes through the operator network. The data path through the network may include base stations and/or gateways. If the devices are in close proximity with each other, their data path may be routed locally through a local base station. In general, communications between a network node such as a base station and a wireless terminal is known as "WAN" or "Cellular communication".

It is also possible for two user equipment terminals in close proximity to each other to establish a direct link without the need to go through a base station. Telecommunications systems may use or enable device-to-device ("D2D") communication, in which two or more user equipment terminals directly communicate with one another. In D2D communication, voice and data traffic (referred to herein as "communication signals") from one user equipment terminal to one or more other user equipment terminals may not be communicated through a base station or other network control device of a telecommunication system. Device-to-device (D2D) communication has more recently also become known as "sidelink direct communication".

D2D communication, e.g., sidelink direct communication, can be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for third and fourth generation wireless communication systems. The 3GPP may define specifications for next generation mobile networks, systems, and devices. The 3GPP LTE is the name given to a project to improve the Universal Mobile Telecommunications System ("UMTS") mobile phone or device standard to cope with future requirements. In one aspect, UMTS has been modified to provide support and specification for the Evolved Universal Terrestrial Radio Access ("E-UTRA") and Evolved Universal Terrestrial Radio Access Network ("E-UTRAN"). E-UTRAN is another non-limiting example of a telecommunications standard with which D2D communication may be used. A non-exhaustive list of 3GPP documents which describe, at least in part, device-to-device (D2D) communication (e.g., "sidelink direct communication") include the following (all of which are incorporated herein by reference in their entireties):

3GPP TS 36.201 v12.1.0, Technical Specification, $3^{rd}$ Generation Partnership Project; Technical Specification Group Radio Access Network; Evolved Universal Terrestrial Radio Access (E-UTRA); LTE Physical Layer; General Description (Release 12) (2014 December);

3GPP TS 36.211 v12.4.0, Technical Specification, $3^{rd}$ Generation Partnership Project; Technical Specification Group Radio Access Network; Evolved Universal Terrestrial Radio Access (E-UTRA); Physical Channels and Modulation (Release 12) (2014 December);

3GPP TS 36.212 v12.3.0, Technical Specification, $3^{rd}$ Generation Partnership Project; Technical Specification Group Radio Access Network; Evolved Universal Terrestrial Radio Access (E-UTRA); Multiplexing and Channel Coding (Release 12) (2014 December);

3GPP TS 36.213 v12.0.0, Technical Specification, $3^{rd}$ Generation Partnership Project; Technical Specification Group Radio Access Network; Evolved Universal Terrestrial Radio Access (E-UTRA); Physical Layer Procedures (Release 12) (2013 December);

3GPP TS 36.214 v12.1.0, Technical Specification, $3^{rd}$ Generation Partnership Project; Technical Specification Group Radio Access Network; Evolved Universal Terrestrial Radio Access (E-UTRA); Physical Layer; Measurements (Release 12) (2014 December);

3GPP TS 36.300 v12.4.0, Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; State 2 (Release 12) (2014 December);

3GPP TS 36.304 v12.3.0, Technical Specification, $3^{rd}$ Generation Partnership Project; Technical Specification Group Radio Access Network; Evolved Universal Terrestrial Radio Access (E-UTRA); User Equipment (UE) Procedures in Idle Mode (Release 12) (2014 December);

3GPP TS 36.306 v12.3.0, Technical Specification, $3^{rd}$ Generation Partnership Project; Technical Specification Group Radio Access Network; Evolved Universal Terrestrial Radio Access (E-UTRA); User Equipment (UE) Radio Access Capabilities (Release 12) (2014 December);

3GPP TS 36.321 v12.4.0, Technical Specification, $3^{rd}$ Generation Partnership Project; Technical Specification Group Radio Access Network; Evolved Universal Terrestrial Radio Access (E-UTRA); Medium Access Control (MAC) Protocol Specification (Release 12) (2014 December);

3GPP TS 36.322 v12.1.0, Technical Specification, 3rd Generation Partnership Project; Technical Specification Group Radio Access Network; Evolved Universal Terrestrial Radio Access (E-UTRA); Radio Link Control (RLC) Protocol Specification (Release 12) (2014 September);

3GPP TS 36.323 v12.2.0, Technical Specification, $3^{rd}$ Generation Partnership Project; Technical Specification Group Radio Access Network; Evolved Universal Terrestrial Radio Access (E-UTRA); Packet data Convergence Protocol (PDCP) Specification (Release 12) (2014 December); and 3GPP TS 36.331 v12.4.0, Technical Specification, 3rd Generation Partnership Project; Technical Specification Group Radio Access Network; Evolved Universal Terrestrial Radio Access (E-UTRA); Radio Resource Control (RRC) Protocol Specification (Release 12) (2014 December).

Device to device (D2D) communications provide proximity-based applications and services, representing an emerging social-technological trend. The introduction of a Proximity Services (ProSe) capability in LTE allows the 3GPP industry to serve this developing market, and, at the same time, serve the urgent needs of several Public Safety communities that are jointly committed to LTE. The current assumptions related to D2D communication is that a wireless terminal within network coverage uses resources for D2D discovery and communication assigned by the controlling node. If the wireless terminal is out of network coverage, it may use pre-assigned resources for communications. If the wireless terminal incorrectly determines its situation of in/out of network coverage, e.g., if the wireless terminal tries to use the pre-assigned resources within network coverage, it may affect the current LTE networks with strong interference and thereby be very dangerous. Therefore, a problem which needs to be solved for D2D communications is how the wireless terminal determines whether it is in or out of network coverage.

D2D services include ProSe Direct Communication (e.g., D2D communication, sidelink direct communication) and ProSe Direct Discovery (e.g., D2D discovery, sidelink direct discovery). ProSe Direct Communication is a mode of communication whereby two wireless terminals can communicate with each other directly over the PC5 interface (i.e., direct interface between two wireless terminals). This communication mode is supported when the wireless terminal is served by E-UTRAN and when the wireless terminal is outside of E-UTRA coverage. A transmitter wireless terminal transmits a Scheduling assignment (SA) to indicate the resources it is going to use for data transmission to the receiver wireless terminals. ProSe Direct Discovery is defined as the procedure used by the ProSe-enabled wireless terminal to discover other ProSe-enabled wireless terminal(s) in its proximity using E-UTRA direct radio signals via the PC5 interface.

Generally, the network coverage detection should be based on the downlink received power. In current 3GPP specification TS 36.213, Version 12.0.0, see http://www.3gpp.org/DynaReport/36213.htm, the downlink received power is measured with respect to cell-specific reference signal strength. The coverage can be defined by wireless terminal's downlink received power measurement, or be defined by wireless terminal's RRC state for simpler implementation and specification work. The downlink radio link quality of the primary cell is monitored by the wireless terminal for the purpose of indicating out-of-sync/in-sync status to higher layers. The physical layer in the wireless terminal shall, in radio frames where the radio link quality is assessed, indicate out-of-sync to higher layers through a radio link failure (RLF) report when the radio link quality is worse than the threshold Qout. When the radio link quality is better than the threshold Qin, the physical layer in the wireless terminal shall, in radio frames where the radio link quality is assessed, indicate in-sync to higher layers.

Reusing the out-of-sync definition for out-of-coverage detection in relation to D2D communication has several problems. For example, the RLF is only declared when the UE wireless terminal in RRC_CONNECTED mode. Furthermore, even the RLF is reported to be a correct out-of-coverage indication, it is for the primary cell only, i.e., the wireless terminal may still be in coverage of other usable networks in the same area.

A wireless terminal in Long Term Evolution (LTE) may be in one of two LTE radio resource control (RRC) states or modes: RRC_IDLE or RRC_CONNECTED. A wireless terminal is in RRC_CONNECTED when an RRC connection has been established. If this is not the case (i.e., if no RRC connection is established) the wireless terminal is in RRC_IDLE state. For RRC Idle mode wireless terminal, some metrics, such as the synchronization signal (SS) strength or broadcast signal strength, may be defined as measurement of out-of-coverage. However, these metrics are very complicated to be implemented in LTE networks. All of these bring new heavy burdens to legacy LTE networks.

For reasons mentioned above, in D2D communications when the D2D service and LTE cellular service share the same frequency band, the wireless terminal needs to behave correctly based on whether it is in or outside the coverage of network, so as to minimize its compact (interference) on the present networks, e.g., LTE networks. A problem in this area is to detect the network coverage accurately and efficiently, so that (among other reasons) the wireless terminal in device-to-device (D2D) communications will not interfere with network operation.

What is needed, therefore, among other things are methods, apparatus, and/or techniques for selecting resource utilization methods for purposes such as controlling behavior of a device-to-device (D2D) capable wireless terminal and detecting network coverage for purposes such as ascertaining whether a device-to-device (D2D) capable wireless terminal is in-coverage or out-of-coverage, such as (for example) when the wireless terminal is in Idle Mode. The methods, apparatus, and/or techniques provide benefits that reduce system complexity and improve communication flexibility and efficiency.

In D2D communications, if the D2D service and LTE cellular service share the same frequency, the resource allocation to UE needs to be performed correctly based on whether it is in or outside the coverage of network, so as to minimize its compact (interference) on the present networks, e.g., LTE networks. On the other hand, the issue of load balancing may also be pertinent for an in coverage scenario when one resource allocation method cannot have adequate resources for allocation while another method still has enough resources.

SUMMARY

In one of its aspects the technology disclosed herein concerns a method in a wireless terminal which is in wireless communications with a radio access node over a radio interface. In a basic embodiment and mode the method comprises, when the wireless terminal is configured to perform device-to-device (D2D) communications while camping on a frequency, during a cell selection/reselection operation the wireless terminal considering the camped-on frequency to be a high priority candidate frequency.

In an example embodiment and mode the method further comprises, as a result of the selection/reselection operation the wireless terminal selecting a candidate frequency for use in the device-to-device (D2D) communications.

In an example embodiment and mode the method further comprises, as a result of the selection/reselection operation, the wireless terminal selecting the high priority candidate frequency for use in the device-to-device (D2D) communications.

In an example embodiment and mode the method further comprises, during the cell selection/reselection operation, requiring the wireless terminal to consider selection/reselection candidate frequencies at which the wireless terminal cannot receive or transmit device-to-device (D2D) signals to be of low priority candidate frequencies when the wireless terminal is capable of device-to-device (D2D) communications and is receiving or transmitting, or anticipating receiving or transmitting, device-to-device (D2D) signals on device-to-device (D2D) supported frequencies.

In an example embodiment and mode the method further comprises during the cell selection/reselection operation, requiring the wireless terminal to consider only cell selection/reselection candidate frequencies which are device-to-device (D2D)-supported frequencies when the wireless terminal is capable of device-to-device (D2D) communications and is receiving or transmitting, or anticipating receiving or transmitting, the device-to-device (D2D) signals on the device-to-device (D2D) supported frequencies.

In an example embodiment and mode the method further comprises: determining whether the wireless terminal when engaged in device-to-device (D2D) communications encounters a wireless terminal selected resource mode; and the wireless terminal determining whether to transmit the device-to-device (D2D) signals using resources selected by the wireless terminal from pre-configured device-to-device (D2D) radio resources or using network-allocated radio resources scheduled by the node based on determining whether the wireless terminal encounters the wireless terminal selected resource mode.

In an example embodiment and mode the method further comprises the wireless terminal transmitting device-to-device (D2D) signals using device-to-device (D2D) radio resources selected in accordance with the cell selection/reselection operation.

In another of its aspects the technology disclosed herein concerns a wireless terminal of a communications network which communicates over a radio interface with a radio access node. The wireless terminal comprises a processor which is configured, during a cell selection/reselection operation when the wireless terminal is performing the device-to-device (D2D) communications while camping on frequency, to consider the camped-on frequency to be a high priority candidate frequency for the cell selection/reselection operation.

In an example embodiment, as a result of the selection/reselection operation, the processor is configured to select a candidate frequency for use in the device-to-device (D2D) communications.

In an example embodiment, as the result of the selection/reselection operation, the processor is configured to select the high priority candidate frequency for use in the device-to-device (D2D) communications.

In an example embodiment the processor is configured to require, during the cell selection/reselection operation, the wireless terminal to consider selection/reselection candidate frequencies at which the wireless terminal cannot receive or transmit device-to-device (D2D) signals to be of low priority candidate frequencies when the wireless terminal is capable of device-to-device (D2D) communications and is receiving or transmitting, or anticipating receiving or transmitting, device-to-device (D2D) signals on device-to-device (D2D) supported frequencies.

In an example embodiment the processor is configured to require, during a cell selection/reselection operation, the wireless terminal to consider only cell selection/reselection candidate frequencies which are device-to-device (D2D)-supported frequencies when the wireless terminal is capable of device-to-device (D2D) communications and is receiving or transmitting, or anticipating receiving or transmitting, device-to-device (D2D) signals on device-to-device (D2D) supported frequencies.

In an example embodiment the wireless terminal further comprises a transceiver configured to transmit device-to-device (D2D) signals using device-to-device (D2D) radio resources selected in accordance with the cell selection/reselection operation.

In another of its aspects the technology disclosed herein concerns a method in a wireless terminal which is in wireless communications with a radio access node over a radio interface. In a basic mode the method comprises using a predefined RRC Idle Mode state transition to determine when a wireless terminal encounters an out-of-coverage situation for device-to-device (D2D) communications purposes; and when the out-of-coverage situation is determined, the wireless terminal using pre-configured device-to-device (D2D) radio resources for the device-to-device (D2D) communications.

In an example embodiment and mode the method further comprises the wireless terminal transmitting device-to-device (D2D) signals to another wireless terminal using the pre-configured device-to-device (D2D) radio resources.

In an example embodiment and mode the predefined RRC Idle Mode state transition comprises any one of the following:
 (1) the wireless terminal moving to Any Cell Selection State;
 (2) the wireless terminal moving to Camped Normally State on non-device-to-device (D2D) frequencies;
 (3) the wireless terminal moving to Camped on Any Cell State on non-device-to-device (D2D) frequencies.

In an example embodiment and mode the method further comprises: when the wireless terminal undergoes any one of a set of predefined RRC Idle Mode state transitions, starting an out-of-coverage counter provided that the out-of-coverage counter is not already running and is not already expired; and upon expiration of the out-of-coverage counter, the wireless terminal transmitting the device-to-device (D2D) signals using the pre-configured device-to-device (D2D) radio resources.

In an example embodiment and mode the out-of-coverage counter is a clock which counts elapsing time units.

In an example embodiment and mode the out-of-coverage counter is configured to count occurrences of detection of a network event or marker.

In an example embodiment and mode the method further comprises, when the counter expires, the wireless terminal declaring itself out-of-coverage and transmitting the device-to-device (D2D) signals using the pre-configured radio resources.

In an example embodiment and mode the method further comprises, when the counter expires, allowing the wireless terminal to transmit the device-to-device (D2D) signals using the pre-configured device-to-device (D2D) radio resources.

In an example embodiment and mode the method further comprises at least temporarily stopping the counter if any one of the following occurs:
 the wireless terminal finds a suitable/acceptable cell to camp on in device-to-device (D2D) supported frequencies;
 the wireless terminal is no longer participating in device-to-device (D2D) services/communications;
 the wireless terminal determines that the wireless terminal is out-of-coverage;
 the wireless terminal leaves the Idle Mode.

In an example embodiment and mode the method further comprises, during a cell selection/reselection operation, permitting the wireless terminal to consider only cell selection/reselection candidate frequencies which are device-to-device (D2D)-supported frequencies when the wireless terminal is capable of device-to-device (D2D) communications and is receiving or transmitting, or anticipating receiving or transmitting, device-to-device (D2D) signals on device-to-device (D2D) supported frequencies.

In an example embodiment and mode the method further comprises, during a cell selection/reselection operation, requiring the wireless terminal to consider selection/reselection candidate frequencies at which the wireless terminal cannot receive or transmit device-to-device (D2D) signals to be of low priority candidate frequencies when the wireless terminal is capable of device-to-device (D2D) communications and is receiving or transmitting, or anticipating receiving or transmitting, device-to-device (D2D) signals on device-to-device (D2D) supported frequencies.

In another of its aspects the technology disclosed herein concerns a wireless terminal which is in wireless communications with a radio access node over a radio interface. In a basic example embodiment the wireless terminal comprises a processor configured to use a predefined RRC Idle Mode state transition to determine when a wireless terminal encounters an out-of-coverage situation for device-to-device (D2D) communications purposes; and when the out-of-coverage situation is determined, to use pre-configured device-to-device (D2D) radio resources for the device-to-device (D2D) communications.

In an example embodiment the wireless terminal further comprises a transmitter configured to send device-to-device (D2D) signals to another wireless terminal using the pre-configured device-to-device (D2D) radio resources.

In an example embodiment the predefined RRC Idle Mode state transition comprises any one of the following:
(1) the wireless terminal moving to Any Cell Selection State;
(2) the wireless terminal moving to Camped Normally State on non-device-to-device (D2D) frequencies;
(3) the wireless terminal moving to Camped on Any Cell State on non-device-to-device (D2D) frequencies.

In an example embodiment the processor is further configured: when the wireless terminal undergoes any one of a set of predefined RRC Idle Mode state transitions, to start an out-of-coverage counter provided that the out-of-coverage counter is not already running and is not already expired; and upon expiration of the out-of-coverage counter, to transmit the device-to-device (D2D) signals using the pre-configured device-to-device (D2D) radio resources.

In an example embodiment the out-of-coverage counter is a clock which counts elapsing time units.

In an example embodiment the out-of-coverage counter is configured to count occurrences of detection of a network event or marker.

In an example embodiment the processor is further configured, when the counter expires, to declare the wireless terminal out-of-coverage and to transmit the device-to-device (D2D) signals using the pre-configured radio resources.

In an example embodiment the processor is further configured, when the counter expires, to allow the wireless terminal to transmit the device-to-device (D2D) signals using the pre-configured device-to-device (D2D) radio resources In an example embodiment the processor is further configured to at least temporarily stop the counter if any one of the following occurs:
the wireless terminal finds a suitable/acceptable cell to camp on in device-to-device (D2D) supported frequencies;
the wireless terminal is no longer participating in device-to-device (D2D) services/communications;
the wireless terminal determines that the wireless terminal is out-of-coverage;
the wireless terminal leaves the Idle Mode.

In an example embodiment the processor is further configured, during a cell selection/reselection operation, to permit the wireless terminal to consider only cell selection/reselection candidate frequencies which are device-to-device (D2D)-supported frequencies when the wireless terminal is capable of device-to-device (D2D) communications and is receiving or transmitting, or anticipating receiving or transmitting, device-to-device (D2D) signals on device-to-device (D2D) supported frequencies.

In an example embodiment the processor is further configured, during a cell selection/reselection operation, to require the wireless terminal to consider selection/reselection candidate frequencies at which the wireless terminal cannot receive or transmit device-to-device (D2D) signals to be of low priority candidate frequencies when the wireless terminal is capable of device-to-device (D2D) communications and is receiving or transmitting, or anticipating receiving or transmitting, device-to-device (D2D) signals on device-to-device (D2D) supported frequencies.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 1A-FIG. 1C are schematic views of example embodiments of radio communications networks in which a wireless terminal participate in device-to-device (D2D) communications and implement respective aspects of the technology disclosed herein.

DETAILED DESCRIPTION

Figure 1B:
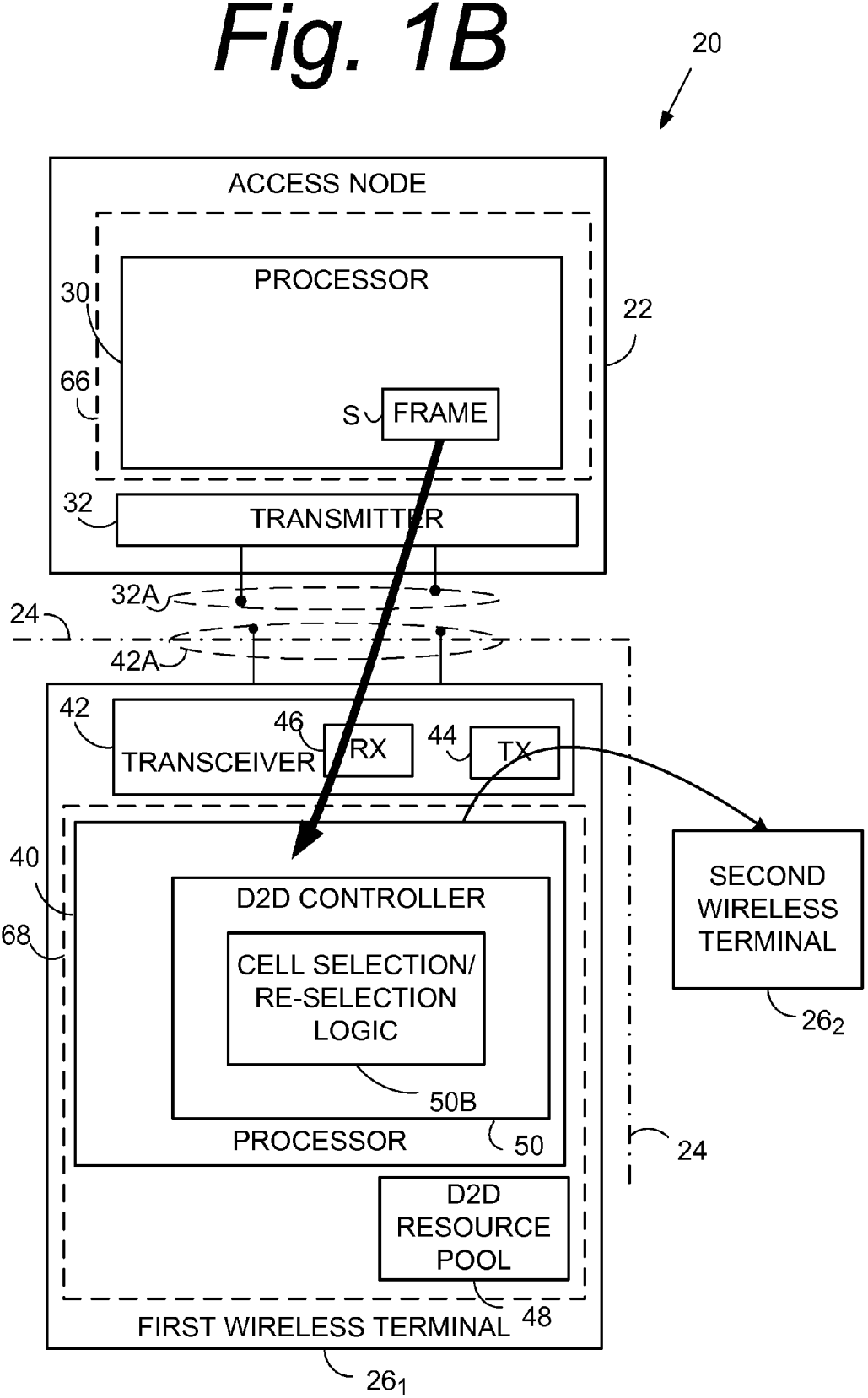

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "device-to-device ("D2D") communication" can refer to a mode of communication between or among wireless terminals that operate on a cellular network or other telecommunications system in which the communication data traffic from one wireless terminal to another wireless terminal does not pass through a centralized base station or other device in the cellular network or other telecommunications system. As explained above, device-to-device (D2D) communication is also known by the more recent term "sidelink direct communication". Communication data is sent using communication signals and can include voice communications or data communications intended for consumption by a user of a wireless terminal Communication signals may be transmitted directly from a first wireless terminal to a second wireless terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As used herein, a "D2D signal" or "D2D signals" include channels, reference signals, and synchronization signals for D2D communication and/or discovery.

One of the aspects of the technology disclosed herein provides, e.g., solutions for detecting LTE network coverage for the purpose of D2D communications. Prevailing current consensus is that network coverage detection should be at least based on the downlink received power. However, the technology disclosed herein, rather than requiring any new type of received signal power measurement and/or new processing, takes advantage of and capitalizes upon the already known wireless terminal state information, especially the idle mode UE states, for network coverage detection.

As a prelude to discussion of the out-of-coverage detection methods and apparatus of the technology disclosed herein, brief general overviews are provided of the Idle Mode; of cell classifications and service types for the RRC Idle state, and of basic concepts of cell selection and re-selection.

If a wireless terminal is in RRC_CONNECTED mode, there is normal RRC connection between wireless terminal and the radio access node (e.g., eNodeB), so the wireless terminal is obviously in the network coverage. But when the wireless terminal is in the Idle Mode the wireless terminal may or may not be in network coverage (e.g., in-coverage). TS 36.304 (V 11.6.0) lists five radio resource control (RRC) states for a wireless terminal, three of which pertain to Idle Mode. The three RRC states which pertain to Idle Mode are: "Camped Normally", "Camped on Any Cell"; and "Any Cell Selection".

In the Camped Normally state the wireless terminal selects and monitors the indicated Paging Channels of the cell according to information sent in system information; monitors relevant System Information (SI); performs necessary measurements for the cell reselection evaluation procedure; and executes the cell reselection evaluation process upon occurrence of certain occasions/triggers.

In the Camped on Any Cell state the wireless terminal monitors relevant System Information; performs necessary measurements for the cell reselection evaluation procedure; and executes the cell reselection evaluation process upon occurrence of certain occasions/triggers. In addition, the wireless terminal regularly attempts to find a suitable cell by trying all frequencies of all radio access technologies (RATs) that are supported by the wireless terminal. If a suitable cell is found, the wireless terminal moves to Camped Normally state. If the wireless terminal supports voice services and the current cell does not support emergency call as indicated in System Information, the wireless terminal performs cell selection/reselection to an acceptable cell of any supported RAT regardless of priorities provided in system information from current cell, if no suitable cell is found.

In the Any Cell Selection state the wireless terminal attempts to find an acceptable cell of any public land mobile network (PLMN) to camp on, trying all radio access technologies (RATs) that are supported by the wireless terminal and searching first for a high quality cell.

The action of camping on a cell is necessary to get access to some services. In general, there are three levels of services defined for a wireless terminal. The first service level, limited service, allows emergency calls, Earthquake and Tsunami Warning System (ETWS), and Commercial Mobile Alert System (CMAS) on an acceptable cell. The second service level, normal service, enables public use on a suitable cell. The third service level, operator service, is for operators only on a reserved cell.

As apparent from the foregoing, cells are categorized according to what services they offer. Mentioned above are "suitable cell", "reserved cell", and "acceptable cell". An "acceptable cell" is a cell on which the wireless terminal may camp to obtain limited service (originate emergency calls and receive ETWS and CMAS notifications). Such a cell fulfills a minimum set of requirements to initiate an emergency call and to receive ETWS and CMAS notification in an E-UTRAN network. A "suitable cell" is a cell on which the wireless terminal may camp on to obtain normal service. The UE shall have a valid USIM and such a cell shall fulfill certain specified requirements. A cell is a "reserved cell" if it is indicated as reserved in system information.

On request of a Non-Access Stratum (NAS) a search is performed for available PLMNs. In so doing, the wireless terminal scans all radio frequency (RF) channels in the E-UTRA bands according to its capabilities to find available PLMNs. On each carrier the wireless terminal searches for the strongest cell and reads its system information, in order to find out to which PLMN(s) the cell belongs. If the wireless terminal can read one or several PLMN identities in the strongest cell, each found PLMN is reported to the NAS as a high quality PLMN (but without the RSRP value), provided that the certain quality criterion is fulfilled. Found PLMNs that do not satisfy the high quality criterion, but for which the wireless terminal has been able to read the PLMN identities, are reported to the NAS together with the RSRP value. Once the wireless terminal has selected a PLMN, the cell selection procedure is performed in order to select a suitable cell of that PLMN to camp on.

In a cell selection and re-selection procedure the wireless terminal performs certain specified measurements. The NAS can control the RAT(s) in which the cell selection is performed, for instance by indicating RAT(s) associated with the selected PLMN, and by maintaining a list of forbidden registration area(s) and a list of equivalent PLMNs. The wireless terminal selects a suitable cell based on idle mode measurements and cell selection criteria. When camped on a cell, the wireless terminal regularly searches for a better cell according to the cell reselection criteria. If a better cell is found, that cell is selected. The change of cell may imply a change of RAT.

Figure 6:
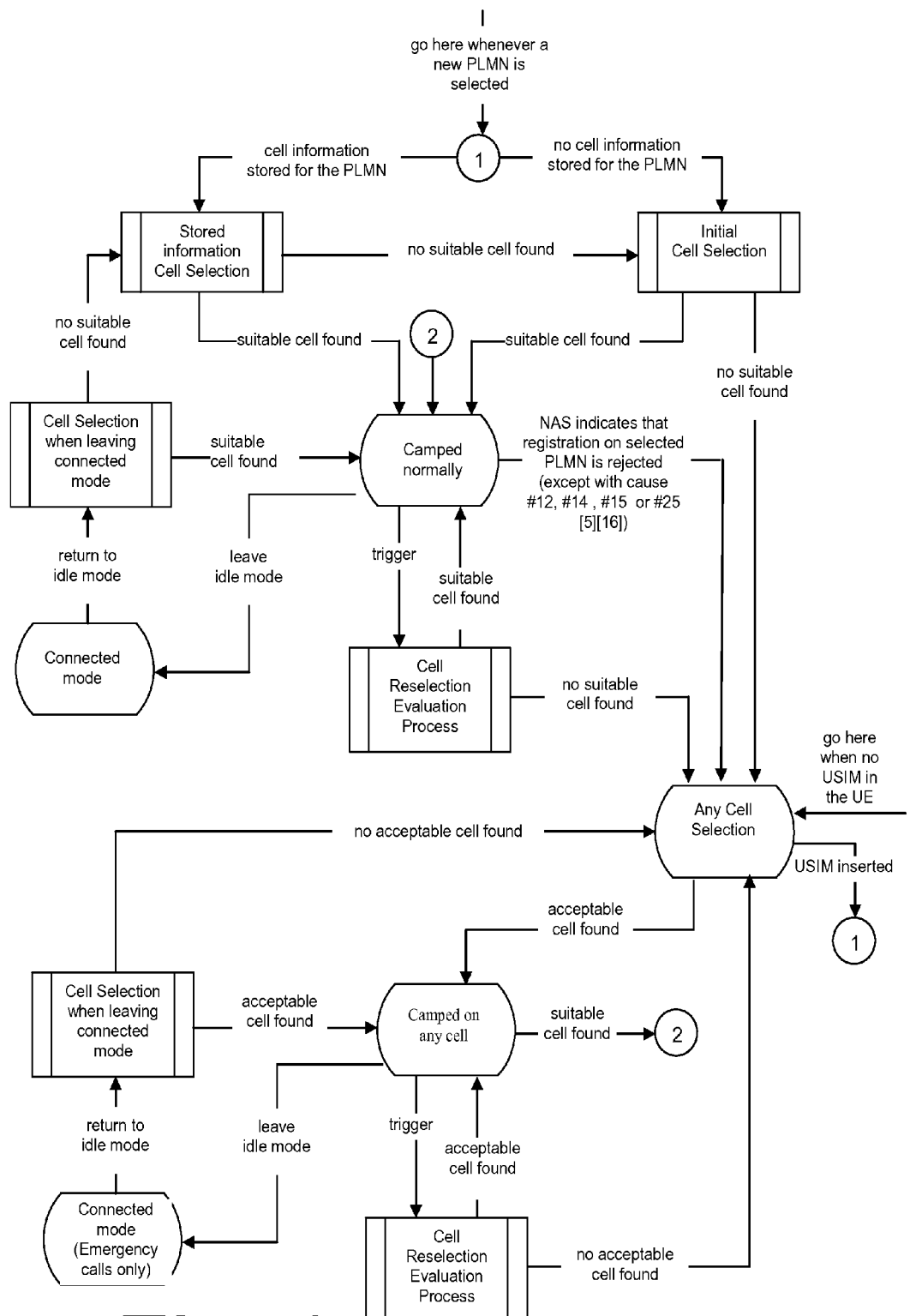
FIG. 6 shows transitions and logic of RRC Idle.

Thus, the wireless terminal may transition through the three previously mentioned states in conjunction with the Idle Mode. Through cell selection/reselection, a wireless terminal in Idle Mode moves to Camped Normally state if the wireless terminal finds a suitable cell (selected PLMN is available) to camp on without registration rejection. Otherwise, the wireless terminal moves to Any Cell Selection state. The wireless terminal moves to Camped on Any Cell state if the wireless terminal finds an acceptable cell (selected PLMN is unavailable) to camp on. If no acceptable cell is found, the wireless terminal stays in Any Cell Selection state. If the wireless terminal in Camped on Any Cell state finds a suitable cell to camp on, the wireless terminal moves to "Camped Normally" directly. These transitions, among other aspects of Idle Mode, are illustrated in FIG. 6, which is reproduced from 3GPP TS 36.304 V8.2.0 (2008 May) section 5.2.2., incorporated herein by reference in its entirety.

A. Network, Node, and Device Overview

FIG. 1A shows an example communications system 20 wherein radio access node 22 communicates over air or radio interface 24 with first wireless terminal 26$_1$. The node 22 comprises node processor 30 and node transmitter 32. The first wireless terminal 26$_1$ comprises terminal processor 40 and terminal transceiver 42. The terminal transceiver 42 typically comprises terminal transmitter circuitry 44 and terminal receiver circuitry 46.

In general operation node 22 and first wireless terminal 26$_1$ communicate with each other across radio interface 24, and may do so using "frames" of information that are typically formatted and prepared by a scheduler of node 22. In Long Term Evolution (LTE) a frame, which may have both downlink portion(s) and uplink portion(s), is communicated between the node and the wireless terminal Each LTE frame may comprise plural subframes. In the time domain, each LTE subframe may be divided into two slots. The transmitted signal in each slot is described by a resource grid comprised of resource elements (RE).

Long Term Evolution (LTE) defines a number of downlink physical channels which carry information received from Medium Access Control (MAC) and higher layers. In Long Term Evolution (LTE) no dedicated data channels are used, instead shared channel resources are used in both downlink and uplink. For example, the Physical Downlink Shared Channel (PDSCH) is the main physical channel used for unicast data transmission, and is also used for transmission of paging information. These shared resources are controlled by one or more schedulers that assign(s) different parts of the downlink and uplink shared channels to different wireless terminals for reception and transmission respectively. The assignments for the shared channels are transmitted in a control region which is provided in the beginning of each downlink subframe. The Physical Downlink Control Channel (PDCCH) carries the resource assignment for wireless terminals.

When a wireless terminal desires to send information on the uplink to the node 22, the wireless terminal sends a scheduling request to the node 22 followed by a buffer status report (BSR) from which the node 22 can determine that the wireless terminal intends to perform an uplink transmission. Thereafter in a downlink (DL) subframe the node 22 indicates on the Physical Downlink Control Channel (PDCCH) what radio resources the wireless terminal may use for its desired uplink transmission, e.g., the node 22 provides an uplink grant for an uplink transmission.

As mentioned above, in some instances wireless terminals may communicate with one another without having those communications transmitted through the node 22. Such terminal-to-terminal communications are also called device-to-device (D2D) communications. At some times the device-to-device (D2D) communications may be under network control or "in-coverage", meaning that one or more of the wireless terminal involved in the device-to-device (D2D) communications may be within range of radio frequencies utilized by a node or cell of a radio access network (RAN). When "in-coverage" care must be taken that use of radio resources of the device-to-device (D2D) communications not cause interference with the other types of communications on-going in the cell, e.g., communications between the node 22 and the wireless terminals served by the node 22.

The terminal transceiver 42 preferably comprises terminal transmitter circuitry ("transmitter") 44 and terminal receiver circuitry ("receiver") 46. The receiver 46 of first wireless terminal $26_1$ receives subframe S communicated over radio interface 24 from communications system 20. When in-coverage, in conjunction with device-to-device (D2D) communications the terminal processor 40 may obtain a device-to-device (D2D) grant from the subframe S. The device-to-device (D2D) grant specifies radio resources that first wireless terminal $26_1$ is permitted to use for device-to-device (D2D) communication with another wireless terminal, e.g., second wireless terminal $26_2$. The transmitter 44 of first wireless terminal $26_1$ serves, e.g., to transmit data on the uplink (UL) from first wireless terminal $26_1$ to node 22, but may also serve to transmit device-to-device (D2D) data to another wireless terminal(s), e.g., second wireless terminal $26_2$, using the radio resources permitted by the D2D grant.

There are two modes of device-to-device (D2D) resource allocation. A first mode has several names (all used interchangeably herein), such as "Mode 1", the "eNB scheduled resource allocation mode", and the "network-allocated resource mode". Mode 1 is characterized by: (1) the wireless terminal needing to be RRC_CONNECTED in order to transmit data; (2) the wireless terminal requesting transmission resources from the node (the node schedules transmission resources for transmission of scheduling assignment(s) and data); (3) the wireless terminal sending a scheduling request (D-SR or Random Access) to the node followed by a buffer status report (BSR). Based on the BSR the node can determine that the wireless terminal has data for a ProSe Direct Communication transmission and estimate the resources needed for transmission.

A second mode also has several names (used interchangeably herein), such as "Mode 2", the "wireless terminal selected resource" mode (or, more simply, the "terminal selected resource mode), and the "wireless terminal (UE) autonomous resource selection mode". Mode 2 is characterized by the wireless terminal (UE) on its own selecting resources from resource pools to transmit scheduling assignment and data. The fact that a wireless terminal selects resources "on its own" indicates that the resource selection is "autonomous".

One of the aspects of the technology disclosed herein provides, e.g., techniques for determining when a wireless terminal such as wireless terminal $26_1$ is out-of-coverage. When out-of-coverage, the wireless terminal $26_1$ is no longer entitled for device-to-device (D2D) communications to use the network radio resources which are dynamically allocated by node 22. That is, when out-of-coverage the wireless terminal may not use Mode 1. Instead, when out-of-coverage, the wireless terminal $26_1$ must use for device-to-device (D2D) communications (e.g., communications with other wireless terminals such as second wireless terminal $26_2$) resources selected by the wireless terminal from a pre-configured pool of radio resources (e.g., a wireless terminal selected resource mode). That is, when out-of-coverage the wireless terminal uses Mode 2. FIG. 1A shows terminal processor 40 having access to device-to-device (D2D) resource pool 48, which may at least partially be stored in memory for access by terminal processor 40.

FIG. 1A also shows the wireless terminal $26_1$ as comprising device-to-device (D2D) controller 50. The device-to-device (D2D) controller 50 performs functions for many embodiments and modes described herein. The device-to-device (D2D) controller 50 and indeed wireless terminal $26_1$ may comprise electronic machinery as described herein with reference to FIG. 5, for example. Among the functions performed by device-to-device (D2D) controller 50 are (B) Cell Selection/Re-Selection strategies; and (C) determining out-of-coverage situations. While one or more of these functions may be performed together in a same example embodiment and mode, each function may also be separately performed without necessarily implementing or involving aspects of other functions.

B. Cell Selection/Re-Selection Strategies

Figure 2:
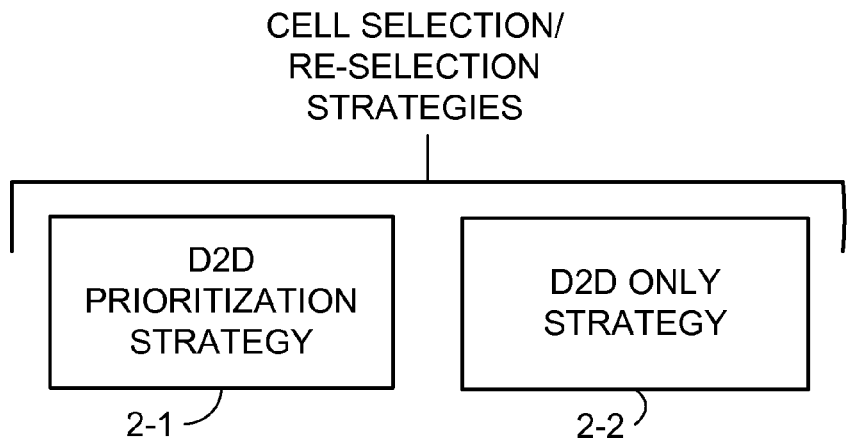
FIG. 2 is a diagrammatic view depicting different types of cell selection/re-selection strategies which may be utilized in conjunction with example out-of-coverage detection methods.

FIG. 1B shows that the device-to-device (D2D) controller 50 of wireless terminal $26_1$ may, in an embodiment and mode, comprise cell selection/re-selection logic 50B. FIG. 2 shows basic, example acts or steps involved in a generic method of operating a wireless terminal engaged in device-to-device (D2D) communications, and particularly different types of cell selection/re-selection strategies which may be utilized in conjunction with the example out-of-coverage detection methods. In an example embodiment and mode the acts of FIG. 2 may be performed by cell selection/re-selection logic 50B of device-to-device (D2D) controller 50

One such cell selection/re-selection, represented by act 2-1 and known as the D2D prioritized strategy, requires the wireless terminal to consider selection/reselection candidate frequencies at which the wireless terminal cannot receive or transmit device-to-device (D2D) signals to be of low priority candidate frequencies when the wireless terminal is capable of device-to-device (D2D) communications and is receiving or transmitting, or anticipating receiving or transmitting, device-to-device (D2D) signals on device-to-device (D2D) supported frequencies. It will be appreciated that, as just-stated, the wireless terminal is receiving or transmitting, or anticipating receiving or transmitting, device-to-device (D2D) signals on device-to-device (D2D) supported frequencies, and as a result of such actual or anticipated receiving or transmitting the wireless terminal is therefore "camped" on a particular frequency and is receiving the "camped on" frequencies through its receiver circuit 46. As such, if the candidate frequencies at which the wireless terminal cannot receive or transmit device-to-device (D2D) signals are considered in the D2D prioritized strategy of act 2-1 to be low priority candidate frequencies as just stated, then naturally the candidate frequencies at which the wireless terminal can receive or transmit device-to-device (D2D) signals, including the camped-on frequency, are considered to be high priority candidate frequencies. Logically the already camped-on frequency will be considered to be the highest priority candidate frequency.

Another such cell selection/re-selection strategy, which is a refinement of the strategy of act 2-1, represented by act 2-2 and known as the D2D only strategy, requires the wireless terminal (e.g., wireless terminal 26₁) to consider only cell selection/reselection candidate frequencies which are device-to-device (D2D)-supported frequencies when the wireless terminal is capable of device-to-device (D2D) communications and is receiving or transmitting, or anticipating receiving or transmitting, device-to-device (D2D) signals on device-to-device (D2D) supported frequencies.

It will be appreciated that, as a result of the selection/reselection operation of either act 2-1 or act 2-1, the wireless terminal and particularly terminal processor 40 selects a candidate frequency for use in the device-to-device (D2D) communications. For example, in conjunction with act 2-1 the terminal processor 40 may select a high priority candidate as the candidate frequency for use in the device-to-device (D2D) communications.

In conjunction with the cell selection/re-selection strategy the a transceiver 42 is configured to transmit device-to-device (D2D) signals using device-to-device (D2D) radio resources selected in accordance with the cell selection/reselection operation.

C. Determining Out-of-Coverage Situations

As mentioned above, one of the aspects of the technology disclosed herein provides techniques for determining when a wireless terminal such as wireless terminal 26₁ is out-of-coverage. As shown in more detail in FIG. 1B terminal processor 40 comprises device-to-device (D2D) controller 50 with coverage detection logic 50C and radio resource control (RRC) state machine 52. As explained herein, in one aspect of the technology disclosed herein terminal processor 40 and particularly device-to-device (D2D) controller 50 thereof uses predefined RRC Idle state transitions to determine when a wireless terminal engaged in device-to-device (D2D) communications encounters an out-of-coverage situation (e.g., a wireless terminal selected resource mode).

Figure 3A:
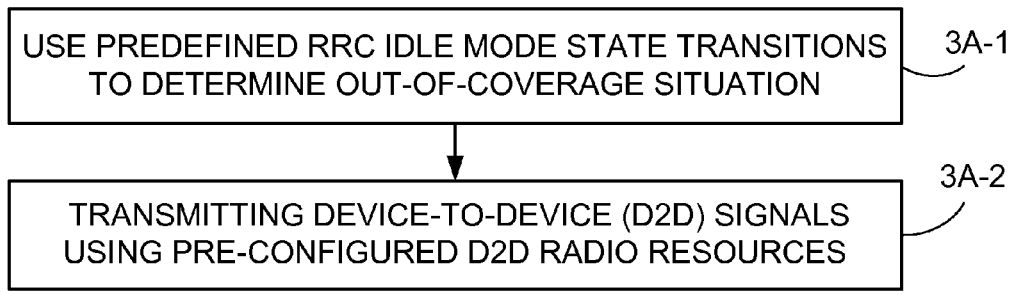
FIG. 3A is a flowchart depicting basic, example acts or steps involved in a generic method of determining when a wireless terminal engaged in device-to-device (D2D) communications encounters an out-of-coverage situation.

FIG. 3A shows basic, example acts or steps involved in a generic method of determining when a wireless terminal encounters an out-of-coverage situation for device-to-device (D2D) communications purposes. "Device-to-device (D2D) communication purposes" (and likewise sidelink direction communication purposes) may comprise a wireless terminal engaged in device-to-device (D2D) communications (e.g., already participating in device-to-device (D2D) communications) or anticipating participating in device-to-device (D2D) communications. The example method of FIG. 3 may be used in conjunction with either the D2D prioritized strategy of act 2-1 or the D2D only strategy of act 2-2. Act 3A-1 comprises the terminal processor 40 using a predefined RRC Idle state transition to determine when a wireless terminal engaged in device-to-device (D2D) communications encounters an out-of-coverage situation. Act 3A-2 comprises, when the out-of-coverage situation is determined, the terminal processor 40 transmitting (over terminal transmitter circuitry 44) device-to-device (D2D) signals using pre-configured resources. For example, act 3A-2 may comprise the terminal processor 40 causing the transmitter 44 of wireless terminal to transmit device-to-device (D2D) signals using resources selected by the wireless terminal from pre-configured device-to-device (D2D) radio resources. As understood from FIG. 1, the pre-configured device-to-device (D2D) resources may, in an example implementation, be the resources of device-to-device (D2D) resource pool 48.

As used herein, the predefined RRC Idle state transition comprises any one of the following: (1) the wireless terminal moving to Any Cell Selection State; (2) the wireless terminal moving to Camped Normally State on non-device-to-device (D2D) frequencies; (3) the wireless terminal moving to Camped on Any Cell State on non-device-to-device (D2D) frequencies. Collectively these three transitions may be referred to as a set of RRC Idle state transitions, any one of which may indicate an out-of-coverage situation.

Figure 1C:
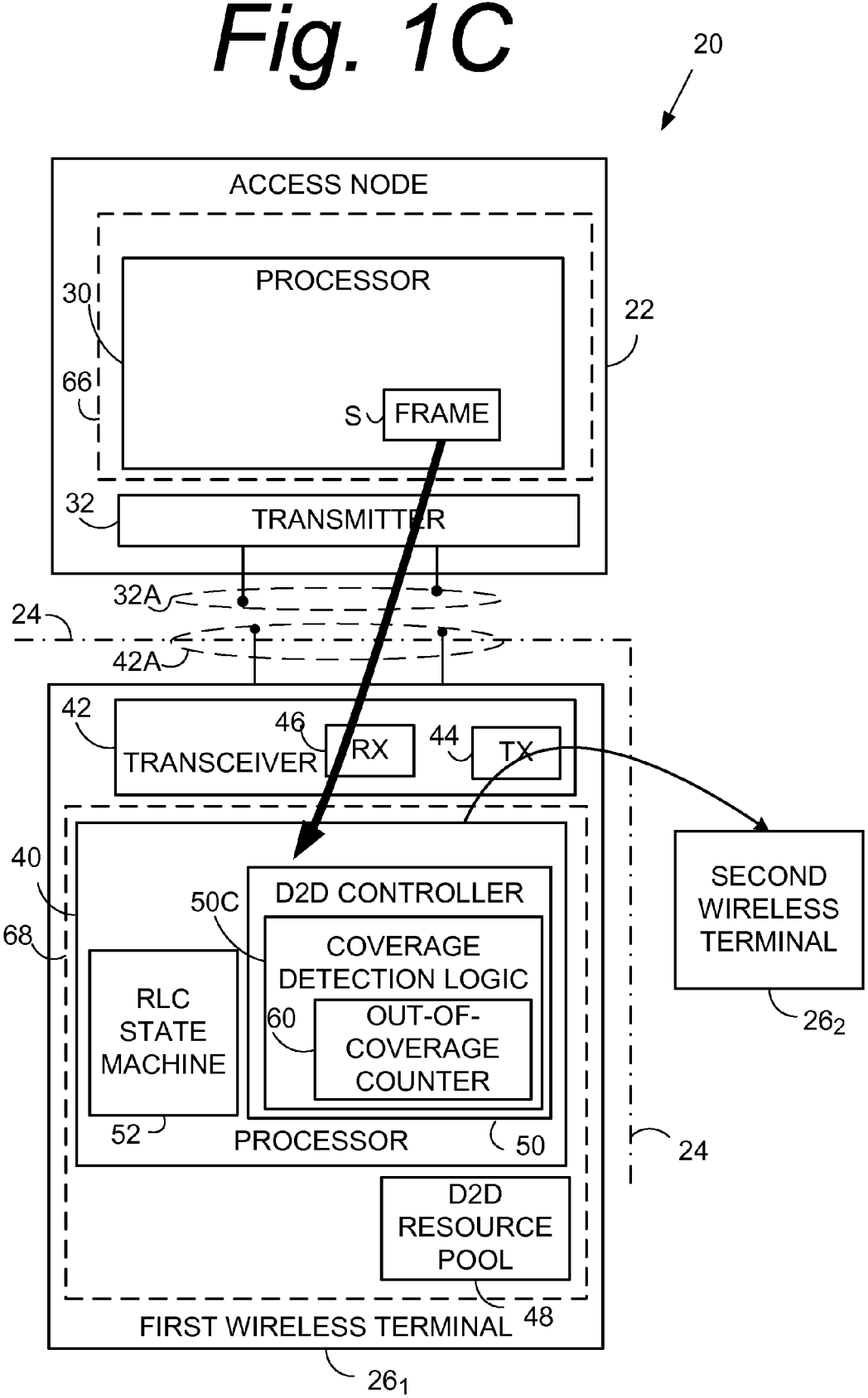
Figure 3B:
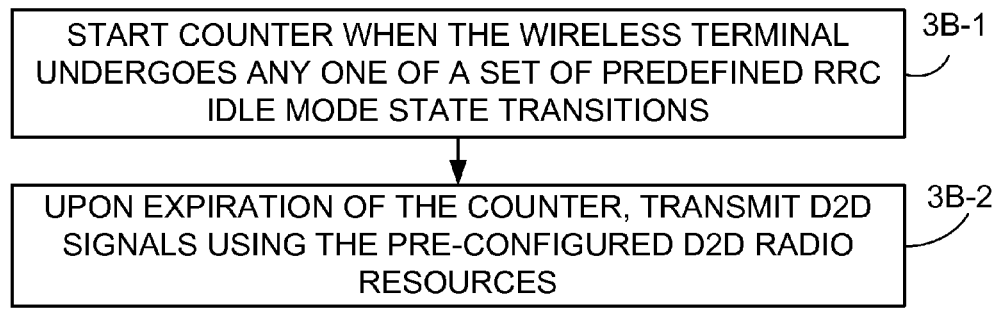
FIG. 3B is a flowchart depicting basic, example acts or steps involved in a counter-based method of determining when a wireless terminal engaged in device-to-device (D2D) communications encounters an out-of-coverage situation.

FIG. 3B shows basic, example acts or steps involved in a counter-based method of determining when a wireless terminal engaged in device-to-device (D2D) communications encounters an out-of-coverage situation (e.g., a wireless terminal selected resource mode). Act 3B-1, which corresponds to an implementation of act 3A-1, comprises the terminal processor 40 starting a resource mode counter 60 (e.g., an out-of-coverage counter) when the wireless terminal undergoes any one of the set of predefined RRC Idle state transitions. FIG. 1C shows that, in an example embodiment and mode, device-to-device (D2D) controller 50 may comprises a counter 60, known as the "out-of-coverage" counter or alternatively as the resource mode counter. In this regard, the device-to-device (D2D) controller 50 of terminal processor 40 requests that RRC state machine 52 notify the device-to-device (D2D) controller 50 when any one of the set of predefined RRC Idle state transitions occurs, and such notification from RRC state machine 52 specifies the nature and/or circumstance of the RRC state transition. Act 3B-2 comprises, upon expiration of the resource mode counter 60, the wireless terminal transmitting (via terminal transmitter circuitry 44) the device-to-device (D2D) signals (e.g., to wireless terminal 26₂) using the resources selected by the wireless terminal from the pre-configured device-to-device (D2D) radio resources rather than using the network-allocated radio resources scheduled by the node.

Thus, if the resource mode counter 60 expires, the wireless terminal owning the resource mode counter 60 is explicitly declared to be out-of-coverage, e.g., out-of-coverage of device-to-device (D2D) frequencies. When being declared out-of-coverage, the wireless terminal is permitted to perform out-of-coverage operations, e.g., to use the D2D radio resource pool 48 for device-to-device (D2D) communications (but not the device-to-device (D2D) frequencies that are allocated by the node 22 using scheduling and grants). If the wireless terminal is in-coverage, on the other hand, for device-to-device (D2D) communications the wireless terminal is required to obtain device-to-device (D2D) resources/frequencies by scheduling from the node 22 (unless, as described below, the node has provided an indication that wireless terminal may, even when in-coverage, select from the device-to-device (D2D) radio resource pool 48). Obtaining device-to-device (D2D) resources/frequencies by scheduling from the node 22 involves sending a scheduling request to node 22 for device-to-device (D2D) resources, and receiving a scheduling grant from the node 22 in return.

The resource mode counter 60 may be realized as any effective way or apparatus of determining a lapse of time since the wireless terminal was notified by RRC state machine 52 of any one of the set of predefined RRC Idle state transitions. In an example non-limiting implementation, resource mode counter 60 comprises a clock which counts elapsing time units. For example, resource mode counter 60 may be a count-down timer which has an initial value set and then is decremented by the passage of units of time (e.g., seconds). In a situation in which the time initial value is same for each transition of the predetermined set, an example time value may be 10 seconds (see, e.g., http://lteworld.org/forums/lteworld-forum/lte-cell-search, search "period"). In other implementations the resource mode counter 60 may take other forms, such as a circuit or logic configured to count occurrences of detection of a network event or marker. For example, resource mode counter 60 may count or track system frame numbers (SFN).

Thus, an initialization (e.g., "initial") or reference threshold value of resource mode counter 60 may be configurable. The initialization value may be, for example, an integer multiple of wireless terminal cell search periods. A "wireless terminal cell search period" is understood by the person skilled in the art to be a time window allotted for a wireless terminal to search for a cell, such as may occur when the wireless terminal is powered on, for example. Alternatively, the initialization or reference threshold for counter may be multiple attempts of wireless terminal cell search. As yet another alternative implementation, the initialization value of the resource mode counter may be set differently for a first of the predefined RRC Idle state transitions than for a second of the predefined RRC Idle state transitions. For example, the timer threshold of resource mode counter 60 for transition from Camped Normally state to Any Cell Selection State can be set higher than the one with transition from Camped on Any Cell state to Any Cell Selection State.

In the example methods of FIG. 3A and FIG. 3B, preferably the resource mode counter 60 is started on condition that the resource mode counter 60 is not already running and is not already expired. It may be that, under certain circumstances, the resource mode counter 60 is started as a result of a first state transition that appears to indicate out-of-coverage, and following that first state transition a second state transition which also appears to indicate out-of-coverage occurs. In such scenario, detection of the second state transition should not "reset" or "restart" the resource mode counter 60, since the cumulative count after the both the first state transition and the second state transition should be taken into consideration regarding the timing of when an actual out-of-coverage occurs. In such scenario, the terminal processor 40 continues operation of the resource mode counter 60 when the wireless terminal undergoes any one of the set of the predefined RRC Idle state transitions and the resource mode counter is already running.

In an example embodiment and mode the method further comprises at least temporarily stopping the counter if any one of the following occurs: (1) the wireless terminal finds a suitable/acceptable cell to camp on in device-to-device (D2D) supported frequencies; (2) the wireless terminal is no longer participating in device-to-device (D2D) services/communications; (3) the wireless terminal determines that the wireless terminal is out-of-coverage; (4) the wireless terminal determines to use resource(s) selected by the wireless terminal from a pre-configured resource; or (5) the wireless terminal leaves the Idle Mode. In comparison with the wireless terminal determining that it is out-of-coverage, the situation in which the wireless terminal determines to use resource(s) selected by the wireless terminal from a pre-configured resource means that the wireless terminal does not have a transitional procedure of determining it is out-of-coverage when the timer expires, and the wireless terminal may start transmitting D2D signals directly.

D. Hardware Implementations

Figure 4:
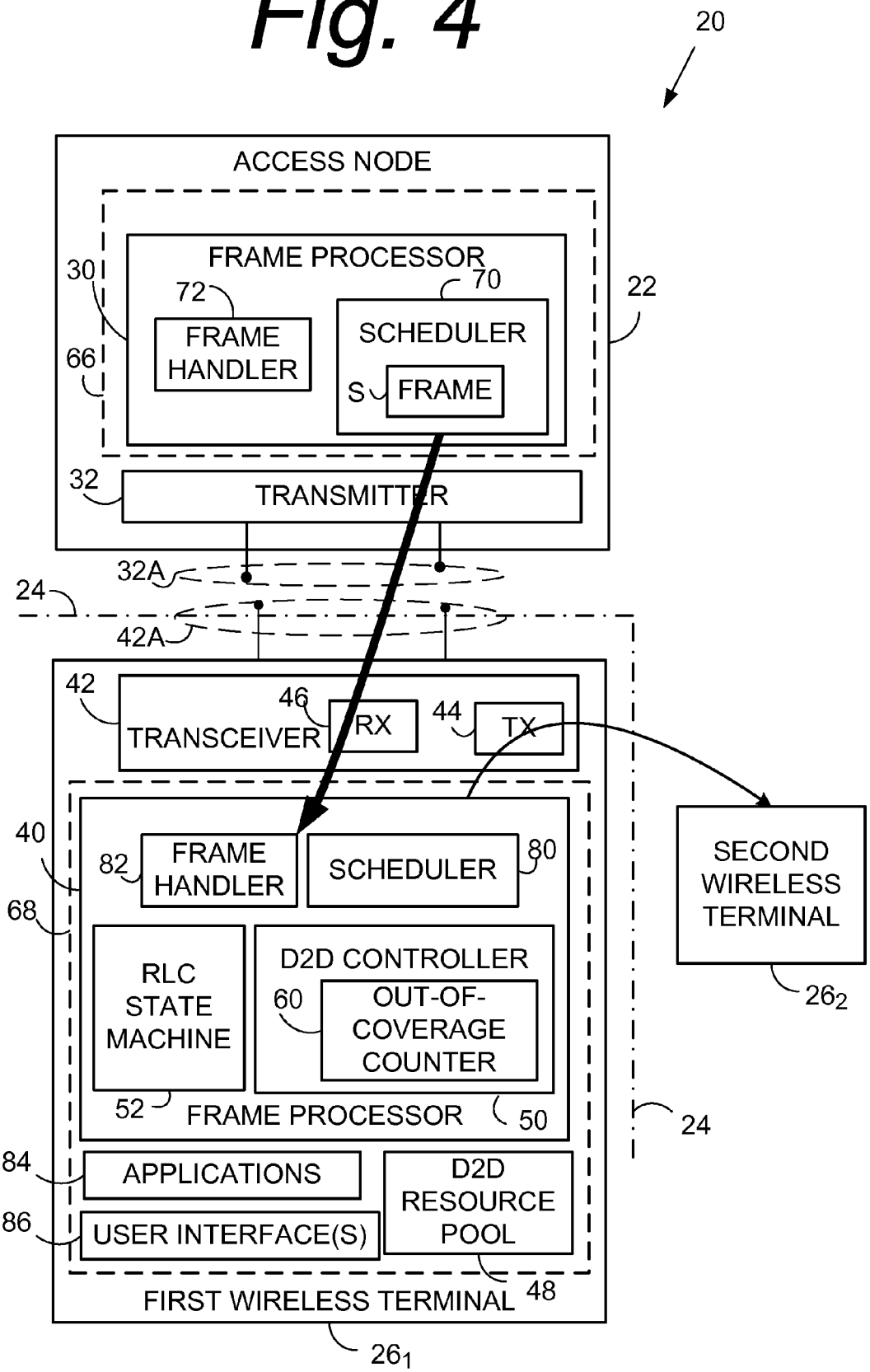
FIG. 4 is a schematic view of a more detailed example implementation which may be implemented for any or all of the embodiments of FIG. 1A-FIG. 1C.

FIG. 4 shows in more detail an example embodiment of the radio communications network of any and all of the example embodiments and modes of FIG. 1A-FIG. 1C. It should be appreciated that FIG. 4 is just one example implementation of how the node 22 and first wireless terminal $26_1$ may be carried out structurally and/or functionally. The example embodiments an modes of FIG. 1A-FIG. 1C are preferably implemented using electronic machinery. The node 22 comprises node electronic machinery 66; first wireless terminal $26_1$ comprises terminal electronic machinery 68. In FIG. 1A-FIG. 1C various units and functionalities as framed by broken lines of node 22 and first wireless terminal $26_1$ are implemented by node electronic machinery 66 and terminal electronic machinery 68, respectively. What comprises node "electronic machinery" is discussed in more detail with reference to FIG. 5.

In the example embodiment of FIG. 4 the node 22 comprises node processor 30, also known as a frame processor, and node transmitter 32. The node transmitter 32 typically includes plural antenna 32A. The node processor 30 is shown in more detail as comprising node scheduler 70 and node frame handler 72. In essence, the node scheduler 70 prepares or formats, into frames, information to be transmitted by node transmitter 32 on the downlink (DL) from node 22 to first wireless terminal $26_1$ (as well as to other wireless terminals). The node frame handler 72 serves, e.g., to process information received in frames on the uplink from wireless terminals, e.g., first wireless terminal $26_1$.

The first wireless terminal $26_1$ comprises terminal processor 40 and terminal transceiver 42. The terminal transceiver 42 typically includes plural antenna 42A. The terminal processor 40 of first wireless terminal $26_1$ of FIG. 4, also known as a frame processor, comprises terminal scheduler 80 and terminal frame handler 82. The terminal frame handler 82 analyzes a downlink (DL) portion of a frame as received over radio interface 24 from node 22. The terminal scheduler 80 prepares uplink frame for transmission to node 22 or, in the case of device-to-device (D2D) communications, to other wireless terminals such as wireless terminal $26_2$.

The first wireless terminal $26_1$ also comprises executable applications 84 and one or more user interfaces (GUIs) 86. The user interfaces (GUIs) 86 may be used to operate or interact with one or more of the executable applications 84. One or more of the applications 84, when executed, may prompt or involve device-to-device (D2D) communications with another wireless terminal, e.g., second wireless terminal $26_2$. When device-to-device (D2D) communications are invoked or initiated by an application, terminal D2D controller 50 superintends or controls the device-to-device (D2D) communications.

Figure 5:
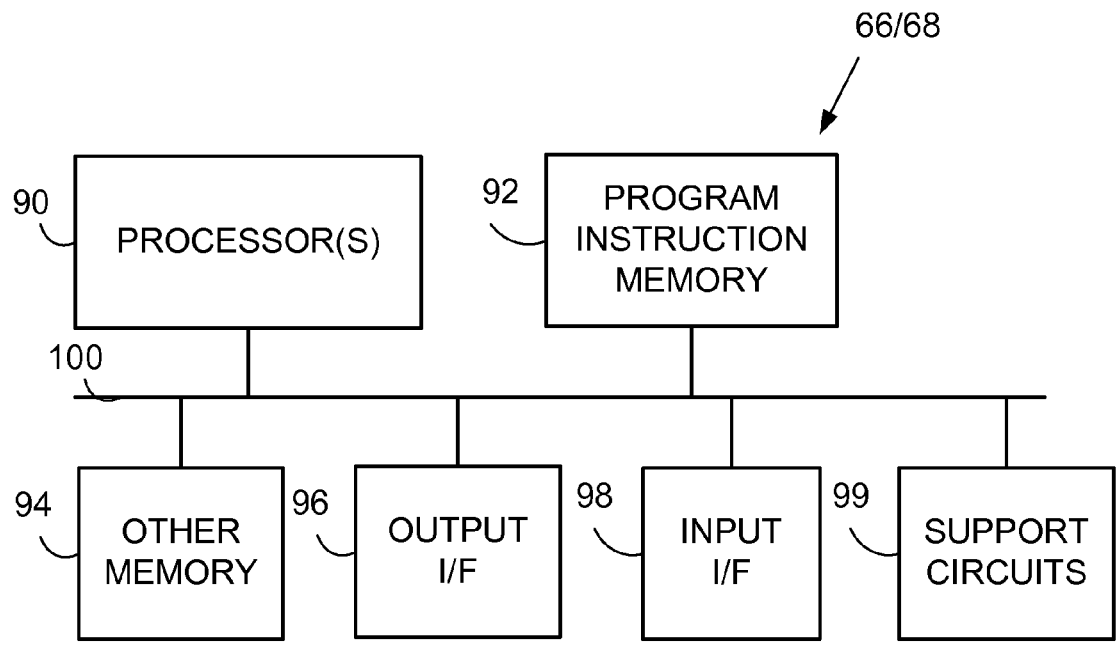
FIG. 5 is a schematic view illustrating an example embodiment of electronic machinery that may comprise a radio access node and/or a wireless terminal.

It was mentioned above that certain units and functionalities of node 22 framed by broken line are, in an example embodiment, implemented by node electronic machinery 66. Similarly, certain units and functionalities of first wireless terminal $26_1$ framed by broken line are, in an example embodiment, implemented by terminal electronic machinery 68. FIG. 5 shows an example of such electronic machinery, whether node electronic machinery 66 or terminal electronic machinery 68, as comprising one or more processors 90, program instruction memory 92; other memory 94 (e.g., RAM, cache, etc.); input/output interfaces 96; peripheral interfaces 98; support circuits 99; and busses 100 for communication between the aforementioned units.

The memory 94, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 99 are coupled to the processors 90 for supporting the processor in a conventional manner. These circuits include cache, power supplies, clock circuits, input/output circuitry and subsystems, and the like.

The resource mode counter 60 may be realized by any appropriate structure, such as a timer (e.g., a clock-down timer) or other event counter that reasonably accurately detects lapse of time since a predetermined Idle State transition. In an example implementation, a timer which is set at an initial value which is decremented is utilized. Alternatively, a count-up timer which, after a predetermined state transition is utilized, reaches a maximum time-out value may be used to determine out-of-coverage.

According to the technology disclosed herein, upon any state transition to Any Cell Selection State (Camped Normally state to Any Cell Selection State, Camped on Any Cell state to Any Cell Selection State), the wireless terminal shall start resource mode counter 60. Upon any state transition to Camped Normally on non-D2D frequencies, the wireless terminal shall start the resource mode counter 60, if it is not running or not expired. Upon any state transition to Camped on Any Cell on non-D2D frequencies, the wireless terminal shall start the resource mode counter 60, if it is not running or not expired. For additional safety (as an optional feature), to provide robustness, it is possible that upon any state transition to Any Cell Selection State, upon any state transition to Camped Normally on non-D2D frequencies or upon any state transition to Camped on Any Cell on non-D2D frequencies, the wireless terminal may be triggered to restart the counter 60, if the counter 60 is running.

The technology disclosed herein provides numerous benefits, including determining out-of-coverage condition on the basis of downlink received power since camping procedures are essentially based on downlink received power. In addition, counters such as resource mode counter 60 are easily implemented in current networks such as Long Term Evolution (LTE) networks. Yet further, impacts on both legacy Long Term Evolution (LTE) specifications and current cellular services are minimized.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Some the terminology employed for concepts as described herein has been updated or changed in more recent industry documentation, such as the 3GPP Technical Standards, for example. As mentioned above, "device-to-device (D2D)" is now also called "sidelink direct". Some other terminology has also changed, a partial listing appearing in Table 1 below.

TABLE 1

| Terminology | |
|---|---|
| Previous Terminology | New Terminology |
| Schedule assignment SA | SCI (Sidelink Control Information) on PSCCH (Physical Sidelink Control Channel) |
| PD2DSCH (Phys. D2D Synch. Channel) | PSBCH (Phys. Sidelink Broadcast Channel) |
| D2DSS (D2D synchronization signals) | SLSS (Sidelink Synchronization Signals) |
| D2D Communications or Data Channel | PSSCH (Physical Sidelink Shared Channel) |
| D2D Discovery Channel | DSDCH |

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method carried out by a wireless terminal which is in wireless communications with a radio access node over a radio interface, the method comprising:
    performing a cell selection/reselection operation; and
    setting one frequency to a highest priority frequency with respect to the cell selection/reselection operation while the wireless terminal is simultaneously performing:
    (i) device-to-device (D2D) communications in a state where the wireless terminal camps on the one frequency; and
    (ii) the cell selection/reselection operation.

2. The method of claim 1, further comprising as a result of the selection/reselection operation the wireless terminal selecting a candidate frequency for use in the device-to-device (D2D) communications.

3. The method of claim 1, further comprising during the cell selection/reselection operation, requiring the wireless terminal to set selection/reselection candidate frequencies at which the wireless terminal cannot receive or transmit device-to-device (D2D) signals to be of low priority candidate frequencies when the wireless terminal is capable of device-to-device (D2D) communications and is receiving or transmitting, or anticipating receiving or transmitting, device-to-device (D2D) signals on device-to-device (D2D) supported frequencies.

4. The method of claim 1, further comprising during the cell selection/reselection operation, requiring the wireless terminal to set only cell selection/reselection candidate frequencies which are device-to-device (D2D)-supported frequencies when the wireless terminal is capable of device-to-device (D2D) communications and is receiving or transmitting, or anticipating receiving or transmitting, the device-to-device (D2D) signals on the device-to-device (D2D) supported frequencies.

5. The method of claim 1, further comprising:
    determining whether the wireless terminal when engaged in device-to-device (D2D) communications encounters a wireless terminal selected resource mode; and
    the wireless terminal determining whether to transmit the device-to-device (D2D) signals using resources selected by the wireless terminal from pre-configured device-to-device (D2D) radio resources or using network-allocated radio resources scheduled by the radio access node based on determining whether the wireless terminal encounters the wireless terminal selected resource mode.

6. The method of claim 1, further comprising the wireless terminal transmitting device-to-device (D2D) signals using device-to-device (D2D) radio resources selected in accordance with the cell selection/reselection operation.

7. A wireless terminal of a communications network which communicates over a radio interface with a radio access node, the wireless terminal comprising:
    a processor;
    a memory in electronic communication with the processor;
    instructions stored in the memory, the instructions being executable to:
    perform a cell selection/reselection operation; and
    set one frequency to a highest priority frequency with respect to the cell selection/reselection operation while the wireless terminal is simulataneously performing:
    (i) the device-to-device (D2D) communications in a state where the wireless terminal camps on the one frequency; and
    (ii) the cell selection/reselection operation.

8. The wireless terminal of claim 7, wherein, as a result of the selection/reselection operation, the instructions are executable to further select a candidate frequency for use in the device-to-device (D2D) communications.

9. The wireless terminal of claim 7, wherein the instructions are executable to further require, during the cell selection/reselection operation, the wireless terminal to set selection/reselection candidate frequencies at which the wireless terminal cannot receive or transmit device-to-device (D2D) signals to be of low priority candidate frequencies when the wireless terminal is capable of device-to-device (D2D) communications and is receiving or transmitting, or anticipating receiving or transmitting, device-to-device (D2D) signals on device-to-device (D2D) supported frequencies.

10. The wireless terminal of claim 7, wherein the instructions are executable to further require, during the cell selection/reselection operation, the wireless terminal to set only cell selection/reselection candidate frequencies which are device-to-device (D2D)-supported frequencies when the wireless terminal is capable of device-to-device (D2D) communications and is receiving or transmitting, or anticipating receiving or transmitting, device-to-device (D2D) signals on device-to-device (D2D) supported frequencies.

11. The wireless terminal of claim 7, wherein the wireless terminal further comprises a transceiver which transmits device-to-device (D2D) signals using device-to-device (D2D) radio resources selected in accordance with the cell selection/reselection operation.

* * * * *